US012512937B2

(12) United States Patent
Zhou et al.

(10) Patent No.: US 12,512,937 B2
(45) Date of Patent: Dec. 30, 2025

(54) DOWNLINK CONTROL INFORMATION BASED BEAM AND PATHLOSS REFERENCE SIGNAL CONFIGURATION ACTIVATION

(71) Applicant: QUALCOMM Incorporated, San Diego, CA (US)

(72) Inventors: Yan Zhou, San Diego, CA (US); Tao Luo, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,650

(22) Filed: Nov. 9, 2020

(65) Prior Publication Data

US 2021/0184809 A1  Jun. 17, 2021

Related U.S. Application Data

(60) Provisional application No. 62/947,982, filed on Dec. 13, 2019.

(51) Int. Cl.
*H04L 5/00* (2006.01)
*H04L 41/0803* (2022.01)
(Continued)

(52) U.S. Cl.
CPC ........ *H04L 5/0048* (2013.01); *H04L 41/0803* (2013.01); *H04W 72/1263* (2013.01); *H04W 72/23* (2023.01); *H04W 74/0833* (2013.01)

(58) Field of Classification Search
None
See application file for complete search history.

(56) References Cited

U.S. PATENT DOCUMENTS 10,123,322 B1 * 11/2018 Nam ................... H04L 5/0092
10,893,431 B2 * 1/2021 Liou ................... H04W 76/19
(Continued)

FOREIGN PATENT DOCUMENTS

CN 108199819 A * 6/2018 ........... H04L 1/0023
CN 109802787 A  5/2019
(Continued)

OTHER PUBLICATIONS

How LTE Stuff Works. DCI Formats in 5G NR. https://web.archive.org/web/20191129234914/http://howltestuffworks.blogspot.com/2019/09/dci-formats-in-5g-nr.html (Nov. 29, 2019).*
(Continued)

*Primary Examiner* — Andrew C Oh
(74) *Attorney, Agent, or Firm* — Harrity & Harrity, LLP

(57) ABSTRACT

Various aspects of the present disclosure generally relate to wireless communication. In some aspects, a user equipment may receive downlink control information (DCI) that includes one or more parameters relating to activating at least one of an uplink beam configuration, a downlink beam configuration, or a pathloss reference signal configuration; activate the uplink beam configuration, the downlink beam configuration, or the pathloss reference signal configuration in accordance with the DCI; and receive or transmit a communication on a beam in accordance with the uplink beam configuration, the downlink beam configuration, or the pathloss reference signal configuration. Numerous other aspects are provided.

30 Claims, 10 Drawing Sheets

(51) Int. Cl.
*H04W 72/1263* (2023.01)
*H04W 72/23* (2023.01)
*H04W 74/0833* (2024.01)

(56) References Cited

U.S. PATENT DOCUMENTS

| | | | |
|---|---|---|---|
| 10,972,244 B2 | 4/2021 | Guo | |
| 11,375,527 B1* | 6/2022 | Eyuboglu | H04B 7/15528 |
| 11,722,183 B2* | 8/2023 | Cao | H04W 72/23 |
| | | | 370/329 |
| 12,016,031 B2* | 6/2024 | Kang | H04L 5/0023 |
| 2014/0119321 A1* | 5/2014 | Wang | H04W 72/04 |
| | | | 370/329 |
| 2015/0245340 A1* | 8/2015 | Cheng | H04W 52/0229 |
| | | | 370/331 |
| 2015/0312927 A1* | 10/2015 | Ko | H04B 7/024 |
| | | | 370/336 |
| 2016/0029267 A1* | 1/2016 | Huang | H04W 36/0058 |
| | | | 455/436 |
| 2017/0134960 A1* | 5/2017 | Zhang | H04W 72/04 |
| 2017/0150454 A1* | 5/2017 | Zhang | H04W 52/386 |
| 2017/0245260 A1* | 8/2017 | Islam | H04W 72/21 |
| 2018/0076940 A1* | 3/2018 | Zhou | H04L 5/005 |
| 2018/0205469 A1* | 7/2018 | Nagaraja | H04L 1/0026 |
| 2018/0343653 A1* | 11/2018 | Guo | H04W 72/1273 |
| 2019/0053072 A1* | 2/2019 | Kundargi | H04W 16/28 |
| 2019/0082456 A1* | 3/2019 | Kim | H04L 27/2602 |
| 2019/0115955 A1* | 4/2019 | John Wilson | H04W 72/042 |
| 2019/0140729 A1* | 5/2019 | Zhang | H04W 76/27 |
| 2019/0141691 A1* | 5/2019 | Kwon | H04B 7/0695 |
| 2019/0141693 A1* | 5/2019 | Guo | H04W 16/14 |
| 2019/0149294 A1* | 5/2019 | Pawar | H04L 27/20 |
| | | | 370/329 |
| 2019/0159102 A1* | 5/2019 | Ryu | H04L 5/0048 |
| 2019/0166615 A1* | 5/2019 | Nimbalker | H04W 72/14 |
| 2019/0174466 A1* | 6/2019 | Zhang | H04L 5/0057 |
| 2019/0190582 A1* | 6/2019 | Guo | H04B 17/327 |
| 2019/0190747 A1 | 6/2019 | Park et al. | |
| 2019/0215220 A1* | 7/2019 | Islam | H04B 7/0695 |
| 2019/0222284 A1* | 7/2019 | Huang | H04W 72/042 |
| 2019/0246395 A1* | 8/2019 | Huang | H04W 72/042 |
| 2019/0254045 A1* | 8/2019 | Sadiq | H04B 7/0617 |
| 2019/0260445 A1* | 8/2019 | John | H04L 5/0007 |
| 2019/0260524 A1* | 8/2019 | Nam | H04L 1/0045 |
| 2019/0260532 A1* | 8/2019 | Manolakos | H04L 5/0094 |
| 2019/0261195 A1* | 8/2019 | Cheng | H04W 72/0413 |
| 2019/0261281 A1* | 8/2019 | Jung | H04W 52/50 |
| 2019/0268053 A1* | 8/2019 | John Wilson | H04B 7/0695 |
| 2019/0273637 A1* | 9/2019 | Zhang | H04W 80/02 |
| 2019/0281514 A1* | 9/2019 | Krishnan | H04W 24/02 |
| 2019/0281588 A1* | 9/2019 | Zhang | H04L 5/0051 |
| 2019/0297603 A1* | 9/2019 | Guo | H04L 5/0051 |
| 2019/0297637 A1* | 9/2019 | Liou | H04W 72/1289 |
| 2019/0306924 A1* | 10/2019 | Zhang | H04L 5/0094 |
| 2019/0313342 A1 | 10/2019 | Papasakellariou | |
| 2019/0313429 A1* | 10/2019 | Cheng | H04W 76/27 |
| 2019/0342907 A1* | 11/2019 | Huang | H04L 5/0053 |
| 2019/0349866 A1 | 11/2019 | Lin et al. | |
| 2019/0349867 A1 | 11/2019 | Molavianjazi et al. | |
| 2019/0349999 A1* | 11/2019 | Islam | H04W 74/008 |
| 2019/0356420 A1* | 11/2019 | John Wilson | H04B 7/0408 |
| 2019/0373450 A1* | 12/2019 | Zhou | H04W 72/048 |
| 2019/0380073 A1* | 12/2019 | Martin | H04W 36/302 |
| 2019/0387418 A1* | 12/2019 | Yerramalli | H04L 5/0051 |
| 2019/0387547 A1* | 12/2019 | Shin | H04W 74/0866 |
| 2019/0394749 A1* | 12/2019 | Islam | H04W 68/02 |
| 2019/0394799 A1* | 12/2019 | Islam | H04W 74/0833 |
| 2020/0015200 A1* | 1/2020 | Vilaipornsawai | H04W 72/23 |
| 2020/0044797 A1* | 2/2020 | Guo | H04W 72/51 |
| 2020/0045700 A1* | 2/2020 | Sun | H04L 5/0091 |
| 2020/0053717 A1* | 2/2020 | Zhou | H04B 7/088 |
| 2020/0053724 A1 | 2/2020 | Molavianjazi et al. | |
| 2020/0053767 A1* | 2/2020 | Bai | H04W 72/02 |
| 2020/0077369 A1* | 3/2020 | Zhang | H04W 72/048 |
| 2020/0092860 A1* | 3/2020 | Khoshnevisan | H04W 76/27 |
| 2020/0107236 A1 | 4/2020 | Tseng et al. | |
| 2020/0112886 A1* | 4/2020 | John Wilson | H04W 36/18 |
| 2020/0112974 A1* | 4/2020 | Sun | H04W 72/23 |
| 2020/0120644 A1* | 4/2020 | Zhou | H04B 7/0617 |
| 2020/0120656 A1* | 4/2020 | Zhou | H04B 7/063 |
| 2020/0145172 A1* | 5/2020 | Zhou | H04W 76/36 |
| 2020/0145983 A1* | 5/2020 | Levitsky | H04L 5/0051 |
| 2020/0178272 A1* | 6/2020 | Khoshnevisan | H04W 72/1263 |
| 2021/0051667 A1* | 2/2021 | Yang | H04W 72/23 |
| 2021/0184800 A1* | 6/2021 | Zhou | H04L 5/0053 |
| 2021/0184819 A1* | 6/2021 | Takeda | H04W 24/10 |
| 2021/0185646 A1 | 6/2021 | Zhou et al. | |
| 2021/0185648 A1 | 6/2021 | Bai et al. | |
| 2021/0185709 A1* | 6/2021 | Takeda | H04B 7/022 |
| 2021/0195583 A1 | 6/2021 | Venugopal et al. | |
| 2021/0212098 A1* | 7/2021 | Yoon | H04W 72/23 |
| 2021/0337548 A1* | 10/2021 | Gao | H04L 5/0023 |
| 2021/0352629 A1* | 11/2021 | Haghighat | H04L 1/1896 |
| 2021/0391899 A1* | 12/2021 | Cao | H04B 17/373 |
| 2021/0391912 A1* | 12/2021 | Hakola | H04B 7/0408 |
| 2022/0007293 A1* | 1/2022 | Kaikkonen | H04W 36/324 |
| 2022/0015131 A1* | 1/2022 | Cheng | H04W 72/23 |
| 2022/0038167 A1* | 2/2022 | Chen | H04B 7/0695 |
| 2022/0046658 A1 | 2/2022 | Zhou et al. | |
| 2022/0053385 A1* | 2/2022 | Li | H04W 36/085 |
| 2022/0183039 A1* | 6/2022 | Matsumura | H04W 16/28 |
| 2022/0232482 A1* | 7/2022 | Matsumura | H04W 52/242 |
| 2022/0248335 A1* | 8/2022 | Matsumura | H04W 52/244 |
| 2022/0248336 A1* | 8/2022 | Matsumura | H04W 52/10 |
| 2022/0271890 A1* | 8/2022 | Grossmann | H04L 5/0051 |
| 2022/0295356 A1* | 9/2022 | Cheng | H04W 36/0055 |
| 2022/0295418 A1* | 9/2022 | Okamura | H04W 52/242 |
| 2022/0312338 A1* | 9/2022 | Matsumura | H04W 52/146 |
| 2022/0330173 A1* | 10/2022 | Matsumura | H04L 5/0051 |
| 2022/0330293 A1* | 10/2022 | Matsumura | H04W 72/23 |
| 2022/0345903 A1* | 10/2022 | Liu | H04L 5/0053 |
| 2022/0393724 A1* | 12/2022 | Matsumura | H04W 16/28 |
| 2023/0007554 A1* | 1/2023 | Turtinen | H04L 1/1864 |
| 2023/0007675 A1* | 1/2023 | Matsumura | H04W 72/1273 |
| 2023/0010532 A1* | 1/2023 | Matsumura | H04L 5/0051 |

FOREIGN PATENT DOCUMENTS

| | | | | |
|---|---|---|---|---|
| CN | 111147211 A | * | 5/2020 | H04B 7/0408 |
| CN | 112789820 A | * | 5/2021 | H04B 7/0626 |
| CN | 112868262 A | * | 5/2021 | H04L 5/0053 |
| CN | 110944405 B | * | 6/2021 | H04L 5/0053 |
| CN | 114208358 A | * | 3/2022 | H04W 36/0055 |
| CN | 110663282 B | * | 9/2023 | H04B 7/088 |
| EP | 3552440 A1 | | 10/2019 | |
| EP | 3734888 A1 | * | 11/2020 | H04B 7/0695 |
| WO | WO-2012124996 A2 | * | 9/2012 | H04L 1/1812 |
| WO | WO-2019049096 A1 | * | 3/2019 | H04B 7/0617 |
| WO | 2019066618 A1 | | 4/2019 | |
| WO | WO-2019099659 A1 | * | 5/2019 | H04B 7/02 |
| WO | 2019138499 A1 | | 7/2019 | |
| WO | WO-2019154066 A1 | * | 8/2019 | H04B 17/373 |
| WO | 2019213921 A1 | | 11/2019 | |
| WO | WO-2019215895 A1 | * | 11/2019 | |
| WO | WO-2019244207 A1 | * | 12/2019 | H04B 7/022 |
| WO | WO-2020036433 A1 | * | 2/2020 | H04B 7/0626 |
| WO | WO-2020063532 A1 | * | 4/2020 | H04B 7/0408 |
| WO | WO-2020063564 A1 | * | 4/2020 | H04B 7/0617 |
| WO | WO-2020089513 A1 | * | 5/2020 | H04B 17/309 |
| WO | WO-2020110098 A1 | * | 6/2020 | H04L 27/26025 |
| WO | WO-2020141014 A1 | * | 7/2020 | H04B 7/0695 |
| WO | 2020180606 A1 | | 9/2020 | |
| WO | WO-2020237534 A1 | * | 12/2020 | H04L 1/0009 |
| WO | WO-2020253969 A1 | * | 12/2020 | |

OTHER PUBLICATIONS

Asustek: "Pathloss Reference Change for Triggering PHR", 3GPP Draft, R2-1804289, Sanya, China, Apr. 16-20, 2018, 3rd Generation Partnership Project (3GPP), Mobile Competence Centre, 650, Route Des Lucioles, F-06921 Sophia-Antipolis Cedex, France, vol. RAN WG2. No. Sanya, China, Apr. 16, 2008-Apr. 20, 2018, Apr. 14, 2018

(56) References Cited

OTHER PUBLICATIONS (Apr. 14, 2018), XP051428045, 3 Pages, Retrieved from the Internet: URL:http://www.3gpp.org/ftp/Meetings%5F3GPP%5FSYNC/RAN2/Docs/ [retrieved on Apr. 14, 2018] Sections 1. 2, Observation 1.
Samsung: "Summary of Email Discussion for FR2 Specific Enhancements", 3GPP Draft, RP-192437, 3GPP TSG RAN Meeting #86, 3rd Generation Partnership Project (3GPP), Mobile Competence Centre, 650, Route Des Lucioles, F-06921 Sophia-Antipolis Cedex, France, vol. TSG RAN. No. Sitges, Spain, Dec. 9, 2012-Dec. 12, 2019, Dec. 2, 2019 (Dec. 2, 2019), XP051835466, 9 Pages, Retrieved from the Internet: URL:https://ftp.3gpp.org/tsg_ran/TSG_RAN/TSGR_86/Docs/RP-192437.zip, RP-192437 R17 NRFR2 enhancement RAN Email Discussion.docx [retrieved on Dec. 2, 2019] Section 2.3.
"5G/NR—QCL/TCI", 5G-ShareTechnote, pp. 1-21.
Asustek: "Pathloss Reference Change for Triggering PHR", 3GPP Draft, R2-1804289, Sanya, China, Apr. 16-20, 2018, 3rd Generation Partnership Project (3GPP), Mobile Competence Centre, 650, Route Des Lucioles, F-06921 Sophia-Antipolis Cedex, France, vol. RAN WG2. No. Sanya, China, Apr. 16, 2018-Apr. 20, 2018, Apr. 14, 2018 (Apr. 14, 2018), XP051428045, 3 Pages, Retrieved from the Internet: URL:http://www.3gpp.org/ftp/Meetings%5F3GPP%5FSYNC/RAN2/Docs/ [retrieved on Apr. 14, 2018] Sections 1. 2, Observation 1.
Ericsson: "Focus Areas for Release-17 feMIMO", 3GPP Draft, R1-1912658, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 8, 2019 (Nov. 8, 2019), XP051820152, pp. 1-10, Retrieved from the Internet: URL:https://ftp.3gpp.org/tsg_ran/WG1_RL1/TSGR1_99/Docs/R1-1912658.zip, R1-1912658 Focus areas for R17 feMIMO.docx [retrieved on Nov. 8, 2019] Section 2.1.
Ericsson: "Further Enhancements on MIMO for NR", 3GPP Draft, RP-192117, 3GPP TSG-RAN Meeting #85, Further Enhancements on MIMO for NR, 3rd Generation Partnership Project (3GPP), Mobile Competence Centre, 650, Route Des Lucioles, F-06921 Sophia-Antipolis Cedex, France, vol. TSG RAN, No. Newport Beach, CA, USA, Sep. 16, 2019-Sep. 19, 2019, Sep. 9, 2019 (Sep. 9, 2019), XP051782634, 7 Pages, Retrieved from the Internet: URL: http://www.3gpp.org/ftp/tsg_ran/TSG_RAN/TSGR_85/Docs/RP-192117 zip [retrieved on Sep. 9, 2019] Slide 3.
International Search Report and Written Opinion—PCT/US2020/070764—ISA/EPO—Mar. 2, 2021.
Qualcomm Incorporated: "Remaining Details on QCL", 3GPP TSG RAN WG1 Meeting AH 1801, 3GPP Draft; R1-1800867, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018 (Jan. 13, 2018), XP051385137, pp. 1-8, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018], Section 2.1.2, Section 2, Figures 2-1 (c), 2-1 (d).
Samsung: "Summary of Email Discussion for FR2 Specific Enhancements", 3GPP Draft, RP-192437, 3GPP TSG RAN Meeting #86, 3rd Generation Partnership Project (3GPP), Mobile Competence Centre, 650, Route Des Lucioles, F-06921 Sophia-Antipolis Cedex, France, vol. TSG RAN. No. Sitges, Spain, Dec. 9, 2019-Dec. 12, 2019, Dec. 2, 2019 (Dec. 2, 2019), XP051835466, 9 Pages, Retrieved from the Internet: URL:https://ftp.3gpp.org/tsg_ran/TSG_RAN/TSGR_86/Docs/RP-192437.zip, RP-192437 R17 NRFR2 enhancement RAN Email Discussion.docx [retrieved on Dec. 2, 2019] Section 2.3.
Ericsson: "MAC CEs for Activating an RS Resource and Handling Corresponding TCI States", 3GPP TSG-RAN WG2 #100, Tdoc R2-1713533, Reno, US, Nov. 27-Dec. 1, 2017, pp. 1-5.
Mediatek Inc: "Discussion on CSI-RS Configuration Update for CQI Reporting and Active Spatial Relation Switch", 3GPP TSG-RAN WG4 Meeting #93, R4-1913316, 3rd Generation Partnership Project , Mobile Competence Centre, 650, Route Des Lucioles, F-06921 Sophia-Antipolis Cedex, France, vol. RAN WG4, No. Reno, Nevada, USA, Nov. 18, 2019-Nov. 22, 2019, Nov. 8, 2019, 8 Pages.
Qualcomm Incorporated: "Remaining Details on QCL", 3GPP TSG RAN WG1 Meeting AH 1801, R1-1800867, 3rd Generation Partnership Project, Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018, pp. 1-8.

\* cited by examiner

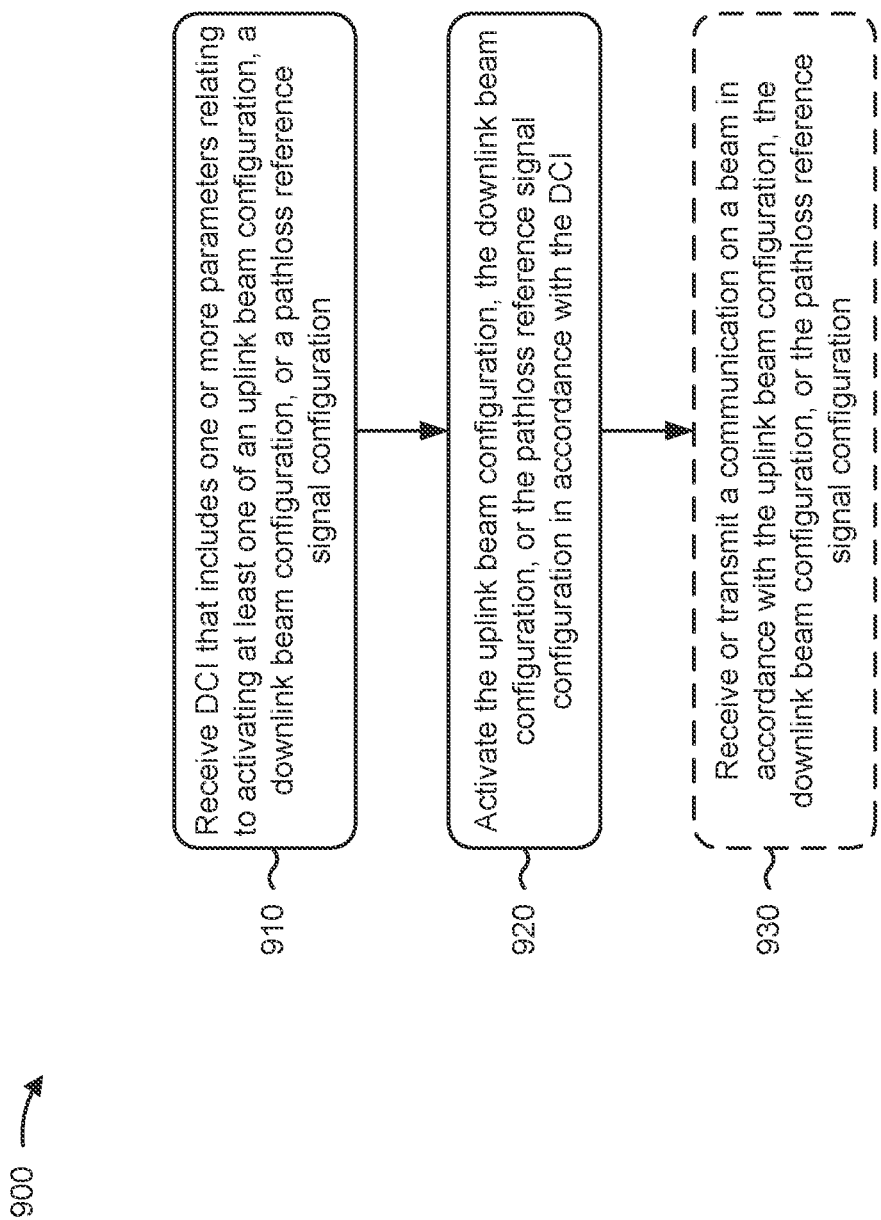

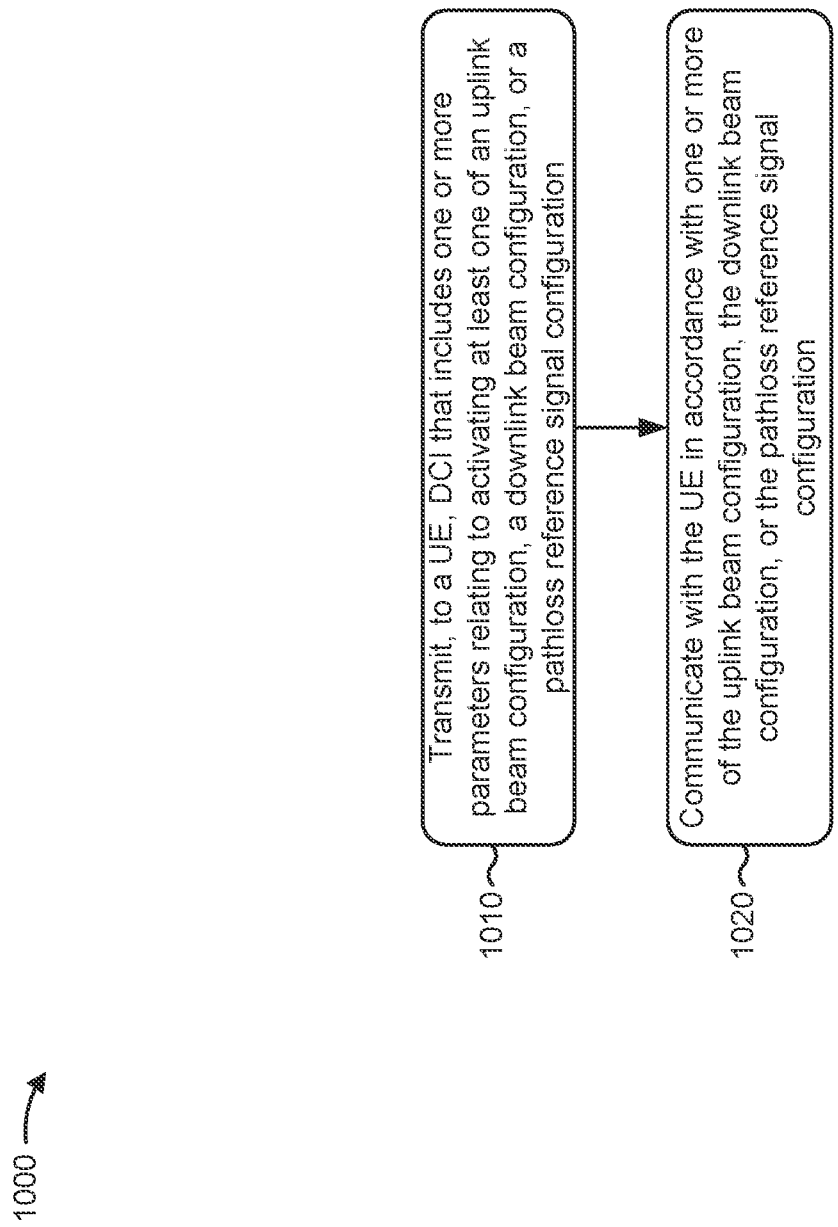

DOWNLINK CONTROL INFORMATION BASED BEAM AND PATHLOSS REFERENCE SIGNAL CONFIGURATION ACTIVATION

CROSS-REFERENCE TO RELATED APPLICATION

This patent application claims priority to U.S. Provisional Patent Application No. 62/947,982, filed on Dec. 13, 2019, entitled "DOWNLINK CONTROL INFORMATION BASED BEAM AND PATHLOSS REFERENCE SIGNAL CONFIGURATION ACTIVATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for downlink control information based beam and pathloss reference signal configuration activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving downlink control information (DCI) that includes one or more parameters relating to activating at least one of an uplink beam configuration, a downlink beam configuration, or a pathloss reference signal configuration; activating the uplink beam configuration, the downlink beam configuration, or the pathloss reference signal configuration in accordance with the DCI; and receiving or transmitting a communication on a beam in accordance with the uplink beam configuration, the downlink beam configuration, or the pathloss reference signal configuration.

In some aspects, a method of wireless communication, performed by a base station, may include transmitting, to a UE, DCI that includes one or more parameters relating to activating at least one of an uplink beam configuration, a downlink beam configuration, or a pathloss reference signal configuration; and communicating with the UE in accordance with one or more of the uplink beam configuration, the downlink beam configuration, or the pathloss reference signal configuration.

In some aspects, a UE for wireless communication may include memory and one or more processors operatively coupled to the memory. The memory and the one or more processors may be configured to receive DCI that includes one or more parameters relating to activating at least one of an uplink beam configuration, a downlink beam configuration, or a pathloss reference signal configuration; activate the uplink beam configuration, the downlink beam configuration, or the pathloss reference signal configuration in accordance with the DCI; and receive or transmit a communication on a beam in accordance with the uplink beam configuration, the downlink beam configuration, or the pathloss reference signal configuration.

In some aspects, a base station for wireless communication may include memory and one or more processors operatively coupled to the memory. The memory and the one or more processors may be configured to transmit, to a UE, DCI that includes one or more parameters relating to activating at least one of an uplink beam configuration, a downlink beam configuration, or a pathloss reference signal configuration; and communicate with the UE in accordance with one or more of the uplink beam configuration, the downlink beam configuration, or the pathloss reference signal configuration.

In some aspects, a non-transitory computer-readable medium may store one or more instructions for wireless communication. The one or more instructions, when executed by one or more processors of a UE, may cause the one or more processors to: receive DCI that includes one or more parameters relating to activating at least one of an uplink beam configuration, a downlink beam configuration, or a pathloss reference signal configuration; activate the uplink beam configuration, the downlink beam configuration, or the pathloss reference signal configuration in accordance with the DCI; and receive or transmit a communication on a beam in accordance with the uplink beam configuration, the downlink beam configuration, or the pathloss reference signal configuration.

In some aspects, a non-transitory computer-readable medium may store one or more instructions for wireless communication. The one or more instructions, when executed by one or more processors of a base station, may cause the one or more processors to: transmit, to a UE, DCI that includes one or more parameters relating to activating at least one of an uplink beam configuration, a downlink beam configuration, or a pathloss reference signal configuration; and communicate with the UE in accordance with one or more of the uplink beam configuration, the downlink beam configuration, or the pathloss reference signal configuration.

In some aspects, an apparatus for wireless communication may include means for receiving DCI that includes one or more parameters relating to activating at least one of an uplink beam configuration, a downlink beam configuration, or a pathloss reference signal configuration; means for activating the uplink beam configuration, the downlink beam configuration, or the pathloss reference signal configuration in accordance with the DCI; and means for receiving or transmitting a communication on a beam in accordance with the uplink beam configuration, the downlink beam configuration, or the pathloss reference signal configuration.

In some aspects, an apparatus for wireless communication may include means for transmitting, to a UE, DCI that includes one or more parameters relating to activating at least one of an uplink beam configuration, a downlink beam configuration, or a pathloss reference signal configuration; and means for communicating with the UE in accordance with one or more of the uplink beam configuration, the downlink beam configuration, or the pathloss reference signal configuration.

In some aspects, a method of wireless communication, performed by a UE, may include receiving DCI that includes one or more parameters relating to activating at least one of an uplink beam configuration, a downlink beam configuration, or a pathloss reference signal configuration; and activating the uplink beam configuration, the downlink beam configuration, or the pathloss reference signal configuration in accordance with the DCI.

In some aspects, a UE for wireless communication may include memory and one or more processors operatively coupled to the memory. The memory and the one or more processors may be configured to receive DCI that includes one or more parameters relating to activating at least one of an uplink beam configuration, a downlink beam configuration, or a pathloss reference signal configuration; and activate the uplink beam configuration, the downlink beam configuration, or the pathloss reference signal configuration in accordance with the DCI.

In some aspects, a non-transitory computer-readable medium may store one or more instructions for wireless communication. The one or more instructions, when executed by one or more processors of a UE, may cause the one or more processors to: receive DCI that includes one or more parameters relating to activating at least one of an uplink beam configuration, a downlink beam configuration, or a pathloss reference signal configuration; and activate the uplink beam configuration, the downlink beam configuration, or the pathloss reference signal configuration in accordance with the DCI.

In some aspects, an apparatus for wireless communication may include means for receiving DCI that includes one or more parameters relating to activating at least one of an uplink beam configuration, a downlink beam configuration, or a pathloss reference signal configuration; and means for activating the uplink beam configuration, the downlink beam configuration, or the pathloss reference signal configuration in accordance with the DCI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a user equipment, in accordance with various aspects of the present disclosure.

FIG. 10 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
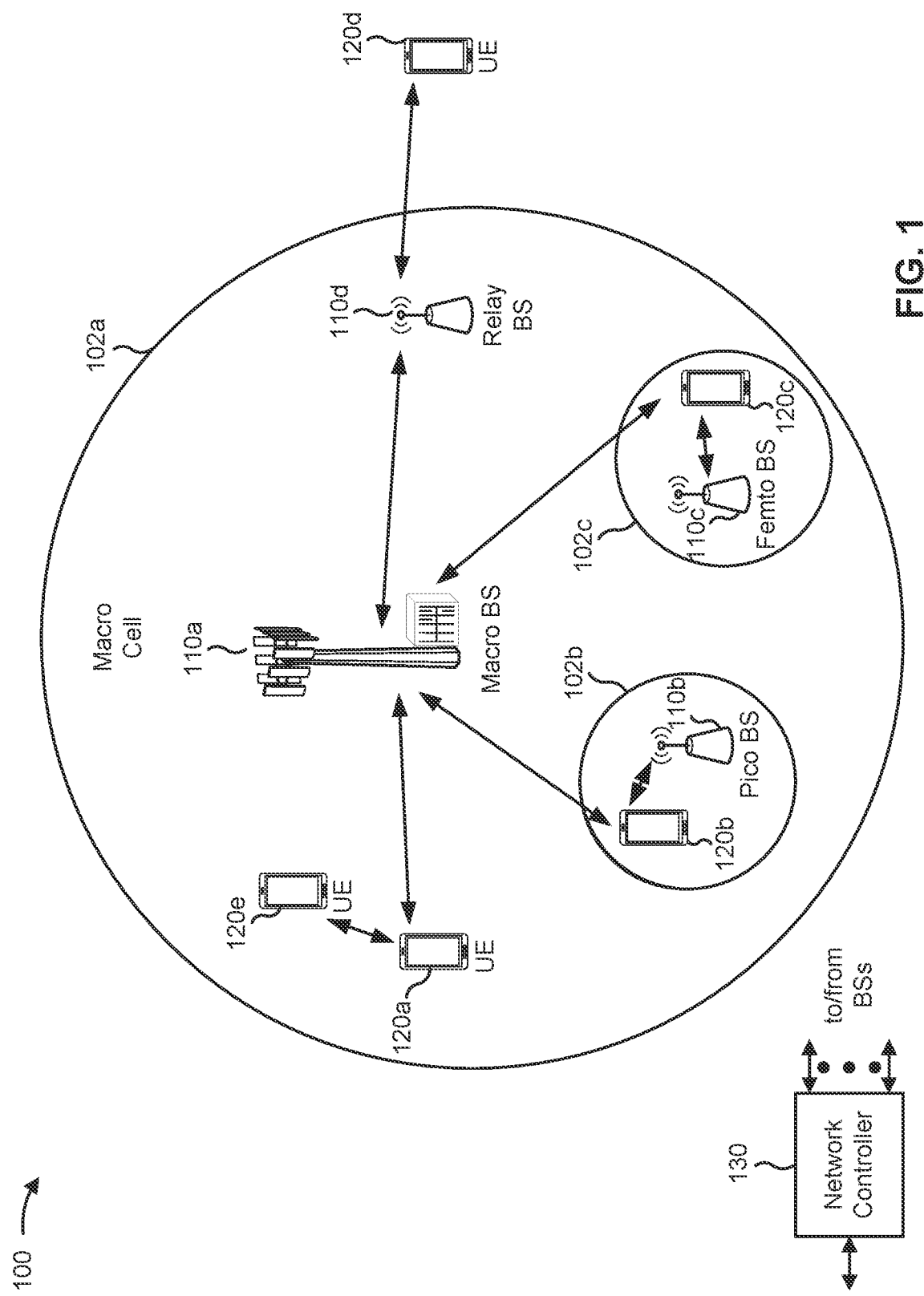
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Wireless communication devices, such as UEs, base stations, transmit-receive points (TRPs), and/or the like, may communicate with each other using beams. A beam may be defined using a transmission configuration indicator (TCI) state. A TCI state for a beam may indicate a source reference signal and a quasi-colocation (QCL) type to be used for the beam. The QCL type may correspond to one or more QCL relationships that indicate how the source reference signal is to be quasi-colocated (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal. Some techniques and apparatuses described herein provide for radio resource control (RRC)-based configuration of TCI states, and activation of one or more TCI states using downlink control information, as described elsewhere herein.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
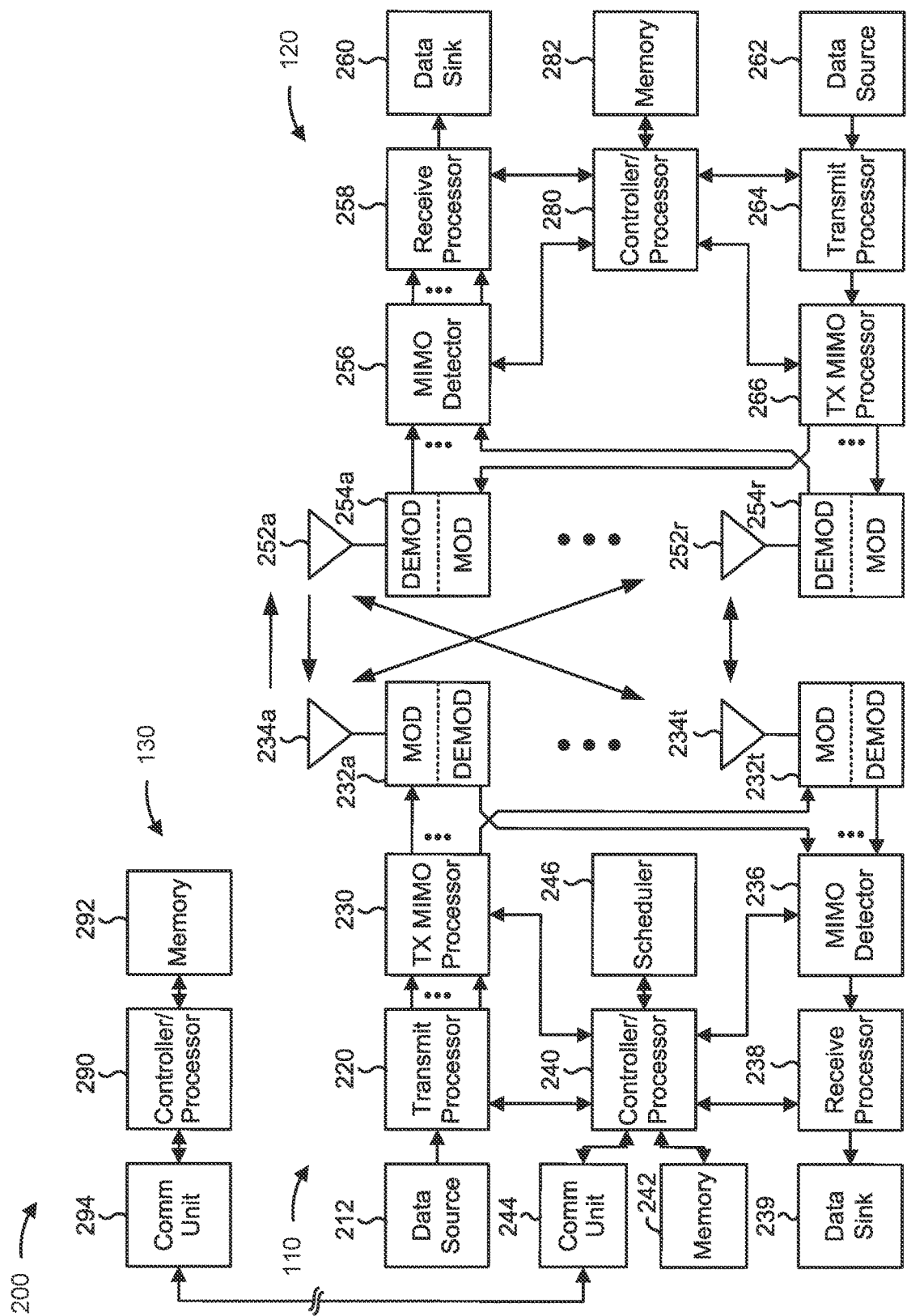
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with downlink control information (DCI) based beam and pathloss reference signal configuration activation, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, UE 120 may include means for receiving DCI that includes one or more parameters relating to activating at least one of an uplink beam configuration, a downlink beam configuration, or a pathloss reference signal configuration; means for activating the uplink beam configuration, the downlink beam configuration, or the pathloss reference signal configuration in accordance with the DCI; means for receiving or transmitting a communication on a beam in accordance with the uplink beam configuration, the downlink beam configuration, or the pathloss reference signal configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, DCI that includes one or more parameters relating to activating at least one of an uplink beam configuration, a downlink beam configuration, or a pathloss reference signal configuration; means for communicating with the UE in accordance with one or more of the uplink beam configuration, the downlink beam configuration, or the pathloss reference signal configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, base stations, transmit-receive points (TRPs), and/or the like, may communicate with each other using beams. A beam may be defined using a TCI state. A TCI state for a beam may indicate a source reference signal and a QCL type to be used for the beam. The QCL type may correspond to one or more QCL relationships that indicate how the source reference signal is to be QCLed with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal. As described elsewhere herein, a base station may configure a plurality of TCI states. A subset of these configured TCI states may be activated (such as via medium access control (MAC) signaling or DCI), and may then be available for use to perform transmission or reception. A TCI state may be considered activated if that TCI state is available for selection to perform transmission or reception. For example, a DCI providing an uplink or downlink grant may select any of the activated TCI states (which were activated via MAC or DCI signaling) to be used for transmission or reception of the corresponding grant by the UE.

A UE and a base station (or any transmitter device and any receiver device) may perform beam management to establish and/or refine beams for communication between the UE and the base station. Beam management may enable intra-cell mobility (e.g., as a physical orientation of a UE changes, as clusters or blocking objects in the channel change, and/or the like) and inter-cell mobility (e.g., when a UE is handed over from one base station to another base station), among other procedures.

A UE may communicate based at least in part on a beam configuration, such as an uplink beam configuration, a downlink beam configuration, or a pathloss reference signal configuration. A beam configuration may indicate a DL TCI state or a UL spatial relation that can be used for communication. A beam configuration used for communication by the UE may be selected from a set of active beam configurations associated with corresponding active TCI states. For example, the UE may be configured with a plurality of beam configurations, and the base station may indicate a subset of the plurality of beam configurations as active beam configurations that can potentially be used for a beam of the UE (e.g., a transmit beam or a receive beam). Indicating the subset of the plurality of beam configurations that can potentially be used for a beam of the UE may be referred to as activating the subset of beam configurations, and may make the subset available for selection to perform transmission or reception. If a higher-layer signaling technique (e.g., MAC signaling, such as a MAC control element (MAC-CE)) is used to activate a beam configuration, the UE may experience significant latency while processing the higher-layer signaling and applying the activation command. For example, MAC signaling may generally be associated with an activation latency of approximately 3 ms for the UE to apply a beam or pathloss reference signal activation command. This latency may negatively impact operations of the UE, particularly in situations where active beam configurations change frequently (e.g., frequent mobility operations, such as inter-cell mobility operations or intra-cell mobility operations, operations in higher frequency ranges such as Frequency Range 2).

Some techniques and apparatuses described herein provide physical-layer signaling of activation of an uplink beam configuration, a downlink beam configuration, or a pathloss reference signal configuration. For example, a base station may provide, to a UE using DCI, one or more parameters relating to activating a beam configuration, such as an uplink beam configuration, a downlink beam configuration, or a pathloss reference signal configuration. The UE may activate the beam configuration. If the beam configuration is selected for a communication, the UE may perform the communication using a beam associated with the beam configuration. For example, the UE may transmit a communication using an activated uplink beam configuration, may receive a communication using an activated downlink beam configuration, or may receive a pathloss reference signal using an activated pathloss reference signal configuration.

In this way, the base station may activate beam configurations of the UE using physical-layer signaling, which may reduce latency and overhead relative to higher-layer signaling, thereby conserving computing resources. This may be particularly beneficial for UEs associated with frequent beam configuration changes. Furthermore, beam configuration activation using physical-layer signaling may be particularly beneficial for beam management to support intra-cell mobility operations and Layer 1/Layer 2 centric inter-cell mobility operations, such as to reduce latency and overhead associated with such mobility operations, and for beam management associated with higher frequency ranges, such as Frequency Range 2 (though the techniques and apparatuses described herein are also applicable in lower ranges such as Frequency Range 1).

FIGS. 3-8 are diagrams illustrating examples 300, 400, 500, 600, 700, and 800 of DCI based beam and pathloss reference signal configuration activation, in accordance with various aspects of the present disclosure. As shown, examples 300, 400, 500, 600, 700, and 800 include a UE 120 and a BS 110.

Figure 3:
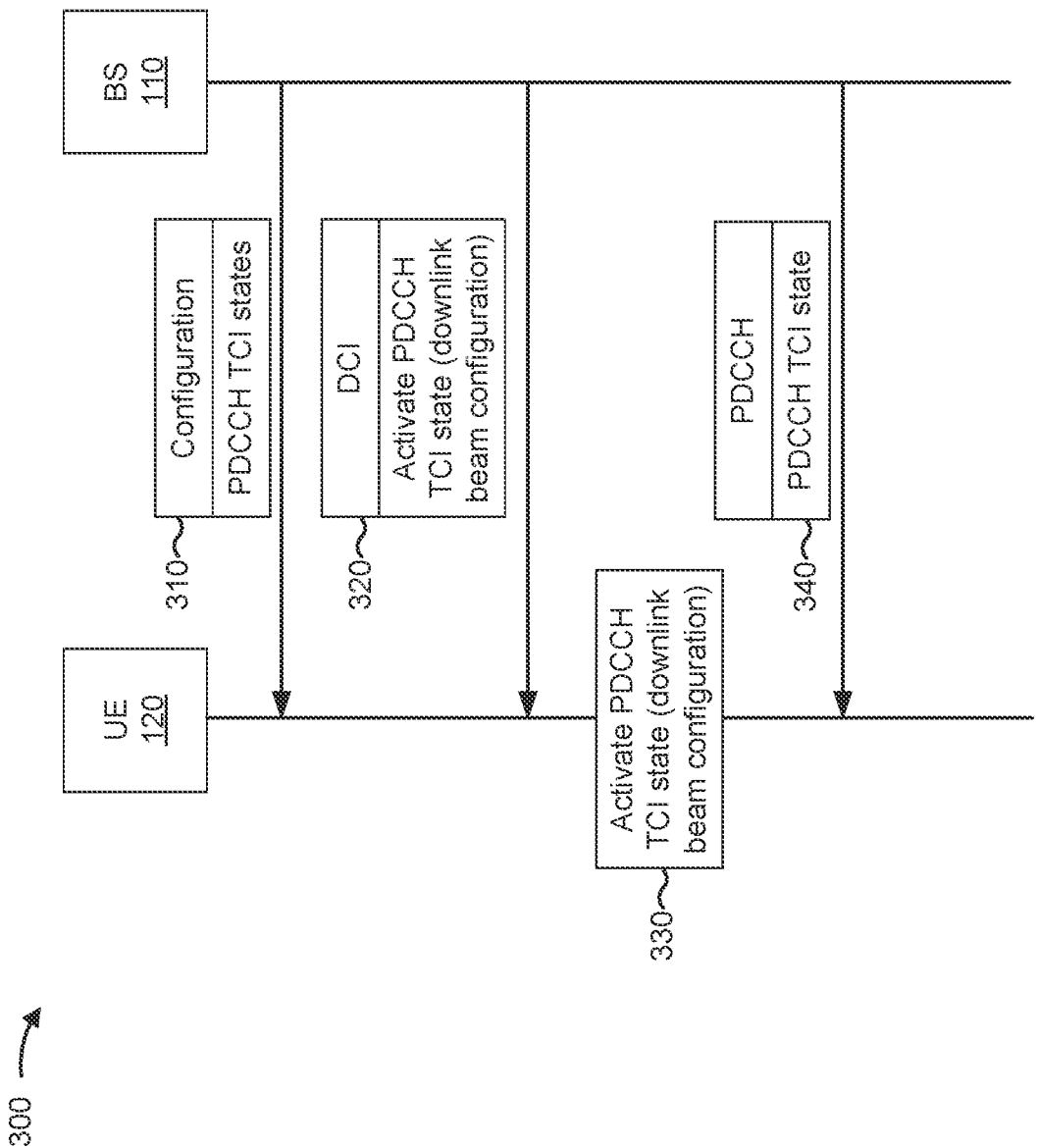
FIGS. 3-8 are diagrams illustrating examples of downlink control information based beam and pathloss reference signal configuration activation, in accordance with various aspects of the present disclosure.

Example 300, shown in FIG. 3, is an example of DCI based activation of a physical downlink control channel (PDCCH) TCI state.

As shown in FIG. 3, and by reference number 310, the BS 110 may provide configuration information to the UE 120. As further shown, the configuration information may include configuration information for a plurality of PDCCH TCI states. In some aspects, a PDCCH TCI state may be referred to as a downlink beam configuration. A PDCCH TCI state may include a TCI state to be used to generate a receive beam in order to receive a PDCCH.

As shown by reference number 320, the BS 110 may transmit DCI to the UE 120. As further shown, the DCI may indicate that a PDCCH TCI state is to be activated. In other words, the DCI may indicate that a downlink beam configuration is to be activated. For example, the DCI may indicate that a downlink beam configuration is available for use to perform transmission or reception. In some aspects, the DCI may include one or more parameters relating to the downlink beam configuration, may identify the downlink beam configuration, and/or the like.

In some aspects, the DCI may schedule an uplink or downlink signal, which may conserve computing resources that would otherwise be used to provide scheduling information separately from the DCI used to activate the downlink beam configuration. In some aspects, the DCI may not schedule an uplink or downlink signal, which may increase flexibility of timing of the DCI and reduce overhead associated with the DCI.

In some aspects, content of the DCI may include one or more parameters associated with the downlink beam configuration, such as a serving cell identifier for the downlink beam configuration, a control resource set identifier associated with the downlink beam configuration, a TCI state identifier associated with the downlink beam configuration, and/or the like. In some aspects, the DCI may identify a QCL source reference signal for the downlink beam configuration. For example, the DCI may identify a QCL source reference signal for each QCL type of the TCI state. The QCL source reference signal may include a synchronization signal block (SSB), a channel state information reference signal (CSI-RS), a sounding reference signal (SRS), and/or the like.

In some aspects, a DCI format of the DCI may be based at least in part on an existing DCI format, such as DCI format 1_1 or 1_2 for PDSCH scheduling. In this case, the DCI may indicate which TCI state, in the DCI, is applied to a control resource set identifier (e.g., using one or more reserved bits, a configurable field of the DCI, and/or the like). In some aspects, the DCI format may not be based at least in part on an existing format. For example, the DCI format may be a new DCI format (e.g., not based on DCI Format 0_0, 0_1, 1_0, 1_1, 1_1, 2_0, 2_1, 2_2, or 2_3).

As shown by reference number 330, the UE 120 may activate the TCI state associated with the PDCCH (e.g., the downlink beam configuration). For example, the UE may make the TCI state indicated by the PDCCH available for use to perform transmission or reception. In some aspects, the UE may use the activated TCI state for a downlink communication (e.g., based at least in part on receiving DCI indicating that the activated TCI state is to be used for a downlink communication (not shown in FIG. 3). For example, the UE 120 may apply a particular spatial filter to a receive antenna or antenna port group, may determine one or more QCL parameters using the QCL source reference signal for the downlink beam configuration, may monitor the QCL source reference signal for the downlink beam configuration, and/or the like. By activating the downlink beam configuration using the DCI, the UE 120 and the BS 110 may reduce latency and overhead, thereby conserving computing resources.

As shown by reference number 340, the BS 110 may transmit, and the UE 120 may receive, the PDCCH in accordance with the TCI state for the PDCCH. For example, as described above, the UE 120 may use the TCI state for the PDCCH to determine QCL properties of a receive beam and to generate the receive beam to receive the PDCCH. In some aspects, when using the downlink beam configuration, a UE may use a same receive beam for a downlink communication as a receive beam used to receive the QCL source reference signal and/or a base station may use a same transmit beam for the downlink communication as a transmit beam used to transmit the QCL source reference signal. In some aspects, the UE 120 may perform a mobility operation, such as an intra-cell mobility operation or an inter-cell mobility operation, using one or more TCI states activated as described in connection with example 300.

Figure 4:
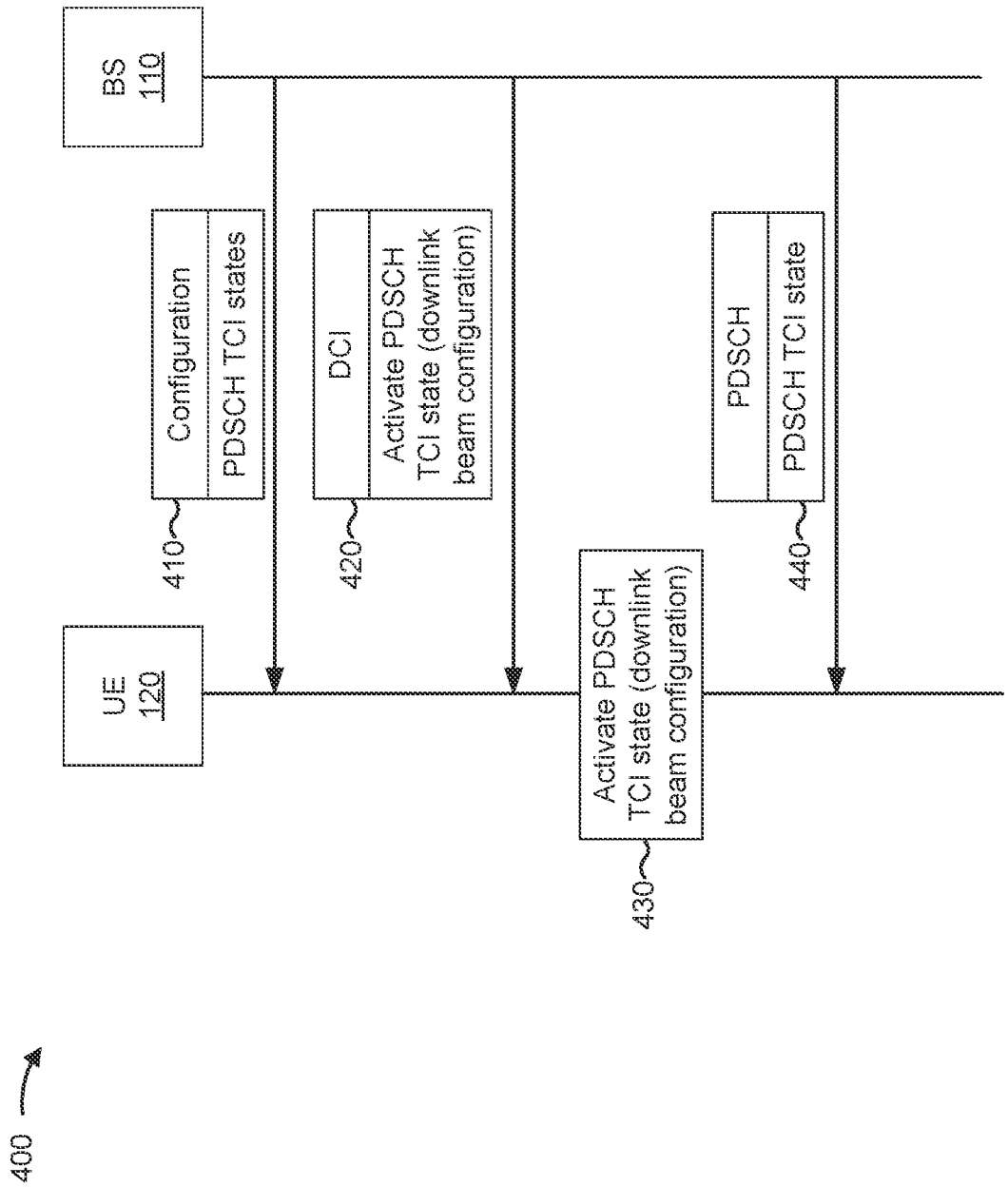

Example 400, shown in FIG. 4, is an example of DCI based activation of a physical downlink shared channel (PDSCH) TCI state.

As shown in FIG. 4, and by reference number 410, the BS 110 may provide configuration information to the UE 120. As further shown, the configuration information may include configuration information for a plurality of PDSCH TCI states. In some aspects, a PDSCH TCI state may be referred to as a downlink beam configuration or a downlink TCI state. A PDSCH TCI state may include a TCI state to be used to generate a receive beam in order to receive a PDSCH.

As shown by reference number 420, the BS 110 may transmit DCI to the UE 120. As further shown, the DCI may indicate that a PDSCH TCI state is to be activated. In other words, the DCI may indicate that a downlink beam configuration is to be activated. For example, the DCI may indicate that the PDSCH TCI state is available for use to perform reception. In some aspects, the DCI may include one or more parameters relating to the downlink beam configuration, may identify the downlink beam configuration, and/or the like.

In some aspects, the DCI may schedule an uplink or downlink signal, which may conserve computing resources that would otherwise be used to provide scheduling information separately from the DCI used to activate the downlink beam configuration. In some aspects, the DCI may not schedule an uplink or downlink communication, which may increase flexibility of timing of the DCI and reduce overhead associated with the DCI.

In some aspects, the DCI may include one or more parameters associated with the downlink beam configuration, such as a serving cell identifier for the downlink beam configuration, a bandwidth part identifier associated with the downlink beam configuration, one or more TCI state identifiers associated with the downlink beam configuration, and/or the like. In some aspects, the DCI may identify a QCL source reference signal for the downlink beam configuration. For example, the DCI may identify a QCL source reference signal per QCL type of the TCI state. The QCL source reference signal may include an SSB, a CSI-RS, an SRS, and/or the like.

In some aspects, a DCI format of the DCI may be based at least in part on an existing DCI format, such as DCI format 1_1 or 1_2 for PDSCH scheduling. In this case, the DCI may indicate which TCI state, in the DCI, is applied to a control resource set identifier (e.g., using one or more reserved bits, a configurable field of the DCI, and/or the like). In some aspects, the DCI format may not be based at least in part on an existing format. For example, the DCI format may be a DCI format specific to activation of TCI states (e.g., not based on DCI Format 0_0, 0_1, 1_0, 1_1, 1_1, 2_0, 2_1, 2_2, or 2_3). In some aspects, the DCI may indicate which TCI state (or downlink beam configuration) is to be activated based at least in part on a condition that the selected TCI state is not activated before receiving the DCI.

As shown by reference number 430, the UE 120 may activate the TCI state associated with the PDSCH (e.g., the downlink beam configuration). For example, the UE 120 may determine that the downlink beam configuration is available for use to perform a reception. In some aspects, the UE may use the activated TCI state for a communication. For example, the UE 120 may apply a particular spatial filter to a receive antenna or antenna port group, may determine one or more QCL parameters using the QCL source reference signal for the downlink beam configuration, may monitor the QCL source reference signal for the downlink beam configuration, and/or the like. By activating the downlink beam configuration using the DCI, the UE 120 and the BS 110 may reduce latency and overhead, thereby conserving computing resources.

As shown by reference number 440, the BS 110 may transmit, and the UE 120 may receive, the PDSCH in accordance with the TCI state for the PDSCH. For example, as described above, the UE 120 may use the TCI state for the PDSCH to determine QCL properties of a receive beam and to generate the receive beam to receive the PDSCH. In some aspects, the UE 120 may perform a mobility operation, such as an intra-cell mobility operation or an inter-cell mobility operation, using one or more TCI states activated as described in connection with example 400.

Figure 5:
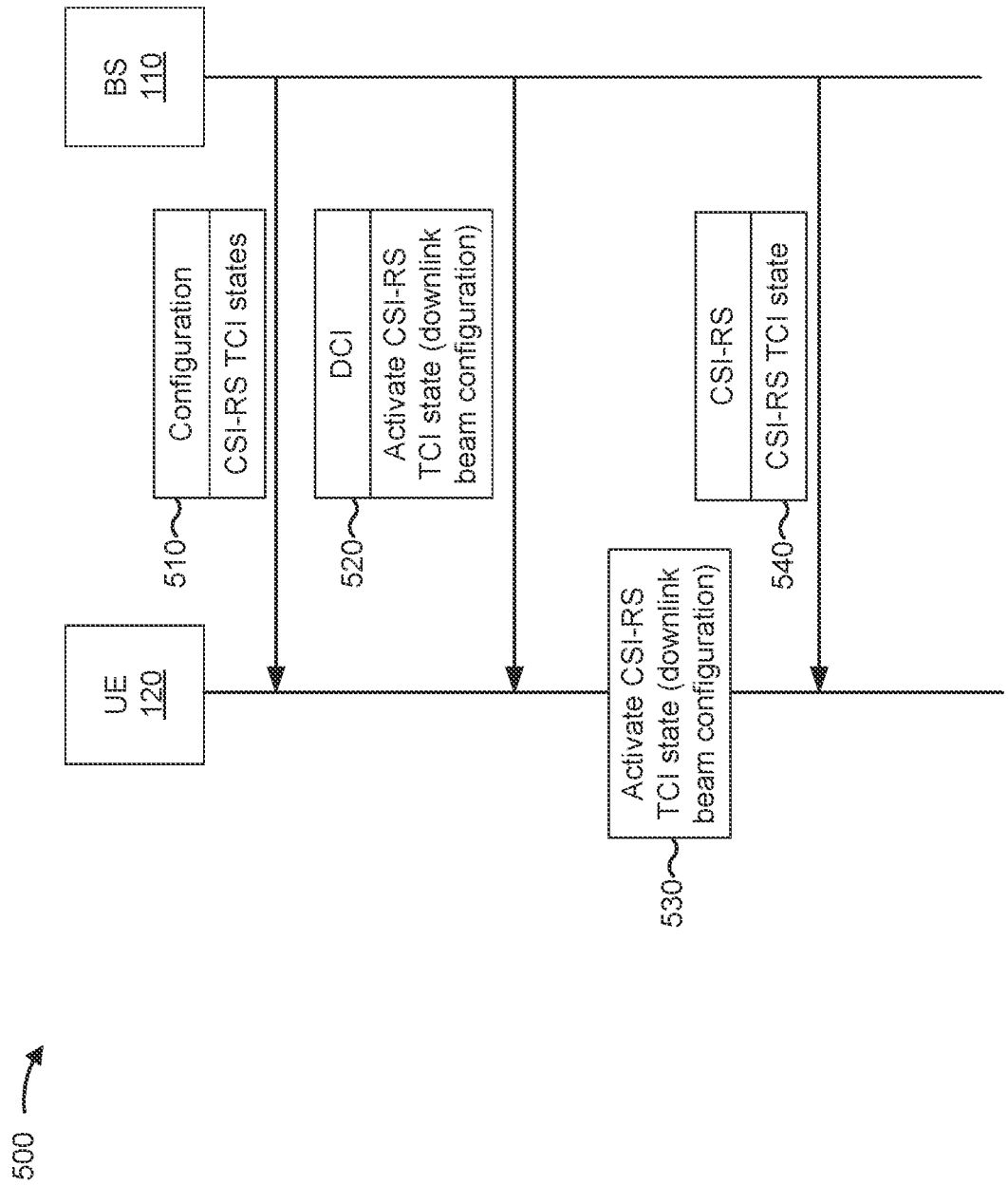

Example 500, shown in FIG. 5, is an example of DCI based activation of a semi-persistent (SP) or aperiodic (AP) channel state information reference signal (CSI-RS) TCI state.

As shown in FIG. 5, and by reference number 510, the BS 110 may provide configuration information to the UE 120. As further shown, the configuration information may include configuration information for a plurality of CSI-RS TCI states. In some aspects, a CSI-RS TCI state may be referred to as a downlink beam configuration. A CSI-RS TCI state may include a TCI state to be used to generate a receive beam in order to receive a CSI-RS, such as an AP-CSI-RS or an SP-CSI-RS.

As shown by reference number 520, the BS 110 may transmit DCI to the UE 120. As further shown, the DCI may indicate that a CSI-RS TCI state is to be activated. For example, the DCI may indicate that the CSI-RS TCI state is to be available for use to perform transmission or reception. In other words, the DCI may indicate that a downlink beam configuration is to be activated. In some aspects, the DCI may include one or more parameters relating to the downlink beam configuration, may identify the downlink beam configuration, and/or the like.

In some aspects, the DCI may schedule an uplink or downlink signal, which may conserve computing resources that would otherwise be used to provide scheduling information separately from the DCI used to activate the downlink beam configuration. In some aspects, the DCI may not schedule an uplink or downlink communication, which may increase flexibility of timing of the DCI and reduce overhead associated with the DCI.

In some aspects, the DCI may include one or more parameters associated with the downlink beam configuration, such as an SP/AP CSI-RS resource set identifier, a serving cell identifier and/or bandwidth part identifier for the SP/AP CSI-RS resource set identifier, an activated TCI state identifier per CSI-RS resource identifier in the CSI-RS resource set, and/or the like.

In some aspects, a DCI format of the DCI may be based at least in part on an existing DCI format, such as DCI format 1_1 or 1_2 for PDSCH scheduling. In this case, the DCI may indicate which TCI state, in the DCI, is applied as an activated TCI state to a CSI-RS resource identifier (e.g., using one or more reserved bits, a configurable field of the DCI, and/or the like). In some aspects, the DCI format may not be based at least in part on an existing format. For example, the DCI format may be a DCI format specific to TCI state activation (e.g., not based on DCI Format 0_0, 0_1, 1_0, 1_1, 1_1, 2_0, 2_1, 2_2, or 2_3). In some aspects, the DCI may indicate which TCI state (or downlink beam configuration) is to be activated based at least in part on a condition that the selected TCI state is not activated before receiving the DCI.

As shown by reference number 530, the UE 120 may activate the TCI state associated with the CSI-RS (e.g., the downlink beam configuration). For example, the UE 120 may determine that the TCI state is available for use to receive a communication. In some aspects, the UE 120 may receive a communication based at least in part on the activated downlink beam configuration. For example, the UE 120 may apply a particular spatial filter to a receive antenna or antenna port group, may monitor the CSI-RS resource set or CSI-RS resource identified by the TCI state, and/or the like. By activating the downlink beam configuration using the DCI, the UE 120 and the BS 110 may reduce latency and overhead, thereby conserving computing resources. In some aspects, the UE 120 may perform a mobility operation, such as an intra-cell mobility operation or an inter-cell mobility operation, using one or more TCI states activated as described in connection with example 500.

As shown by reference number 540, the BS 110 may transmit, and the UE 120 may receive, the CSI-RS in accordance with the TCI state for the CSI-RS. For example, as described above, the UE 120 may use the TCI state for the CSI-RS to determine QCL properties of a receive beam and to generate the receive beam to receive the CSI-RS. In some aspects (not shown in FIG. 5), the UE 120 may transmit CSI feedback based at least in part on receiving the CSI-RS.

Figure 6:
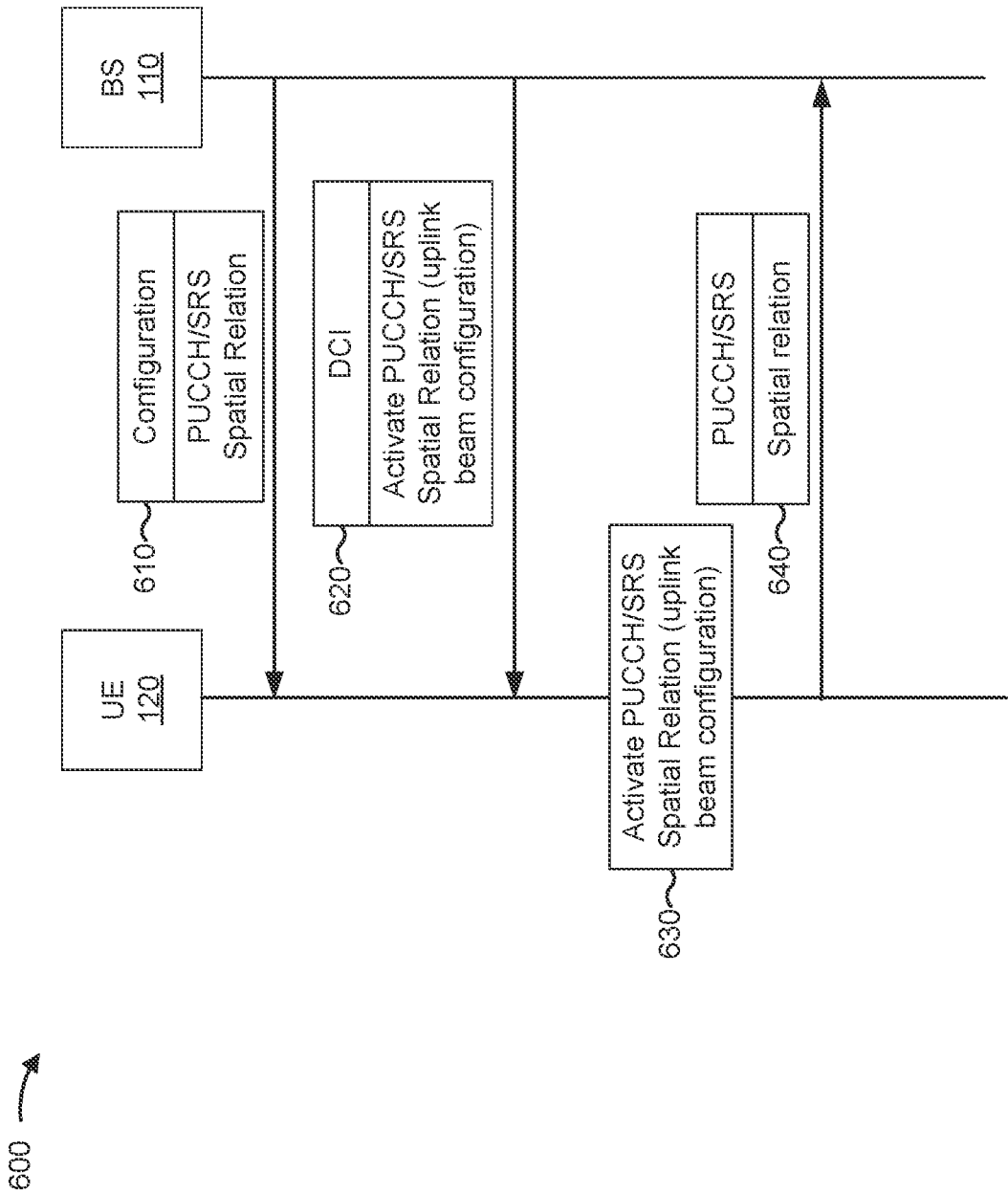

Example 600, shown in FIG. 6, is an example of DCI based activation of a spatial relation for a physical uplink control channel (PUCCH) or an SRS.

As shown in FIG. 6, and by reference number 610, the BS 110 may provide configuration information to the UE 120. As further shown, the configuration information may include configuration information for a plurality of spatial relations for a PUCCH or an SRS. In some aspects, a spatial relation for a PUCCH or an SRS may be referred to as an uplink beam configuration. A spatial relation may identify a relationship between a spatial parameter associated with a reference signal and a spatial parameter associated with the PUCCH or the SRS.

As shown by reference number 620, the BS 110 may transmit DCI to the UE 120. As further shown, the DCI may indicate that a spatial relation is to be activated. For example, the DCI may indicate that the spatial relation is available for use to perform a transmission. In other words, the DCI may indicate that an uplink beam configuration is to be activated. In some aspects, the DCI may include one or more parameters relating to the uplink beam configuration, may identify the uplink beam configuration, and/or the like.

In some aspects, the DCI may schedule an uplink or downlink signal, which may conserve computing resources that would otherwise be used to provide scheduling information separately from the DCI used to activate the uplink beam configuration. In some aspects, the DCI may not schedule an uplink or downlink communication, which may increase flexibility of timing of the DCI and reduce overhead associated with the DCI.

In some aspects, the DCI may include one or more parameters associated with the uplink beam configuration, such as a PUCCH or SRS serving cell identifier, a PUCCH or SRS resource identifier, an SRS resource set identifier, a spatial relationship reference signal identifier for one or more PUCCH or SRS resource identifier (e.g., where the spatial relationship reference signal includes an SSB, a CSI-RS, an SRS, and/or the like), a serving cell identifier and/or bandwidth part identifier per spatial relation reference signal identifier, and/or the like.

In some aspects, a DCI format of the DCI may be based at least in part on an existing DCI format, such as DCI format 0_1 or 0_2 for PUSCH scheduling. In this case, the DCI may indicate a spatial relation of a selected SRS resource identifier, in the DCI, that is to be applied for a PUCCH or SRS resource identifier (e.g., using one or more reserved bits, a configurable field of the DCI, and/or the like). In some aspects, the DCI format may not be based at least in part on an existing format. For example, the DCI format may be a new DCI format (e.g., not based on DCI Format 0_0, 0_1, 1_0, 1_1, 1_1, 2_0, 2_1, 2_2, or 2_3).

As shown by reference number 630, the UE 120 may activate the spatial relation associated with the PUCCH or the SRS (e.g., the uplink beam configuration). For example, the UE 120 may determine that the spatial relation is available for transmission of a communication. In some aspects, the UE 120 may use the spatial relation to transmit the PUCCH or the SRS. For example, the UE 120 may determine a spatial parameter associated with the PUCCH or SRS by reference to a reference signal identified by the spatial relation, and/or the like. By activating the uplink beam configuration using the DCI, the UE 120 and the BS 110 may reduce latency and overhead, thereby conserving computing resources.

As shown by reference number 640, the UE 120 may transmit, and the BS 110 may receive, the PUCCH or SRS in accordance with the spatial relation that is activated for the PUCCH or the SRS. For example, as described above, the UE 120 may use the spatial parameter of the reference signal to generate a beam used to transmit the PUCCH or the SRS. In some aspects, when using the uplink beam configuration, a base station may use a receive beam for an uplink communication or signal corresponding to the identified spatial relation and/or a UE may use a transmit beam for the uplink communication or signal corresponding to the identified spatial relation. In some aspects, the UE 120 may perform a mobility operation, such as an intra-cell mobility operation or an inter-cell mobility operation, using one or more TCI states activated as described in connection with example 600.

Figure 7:
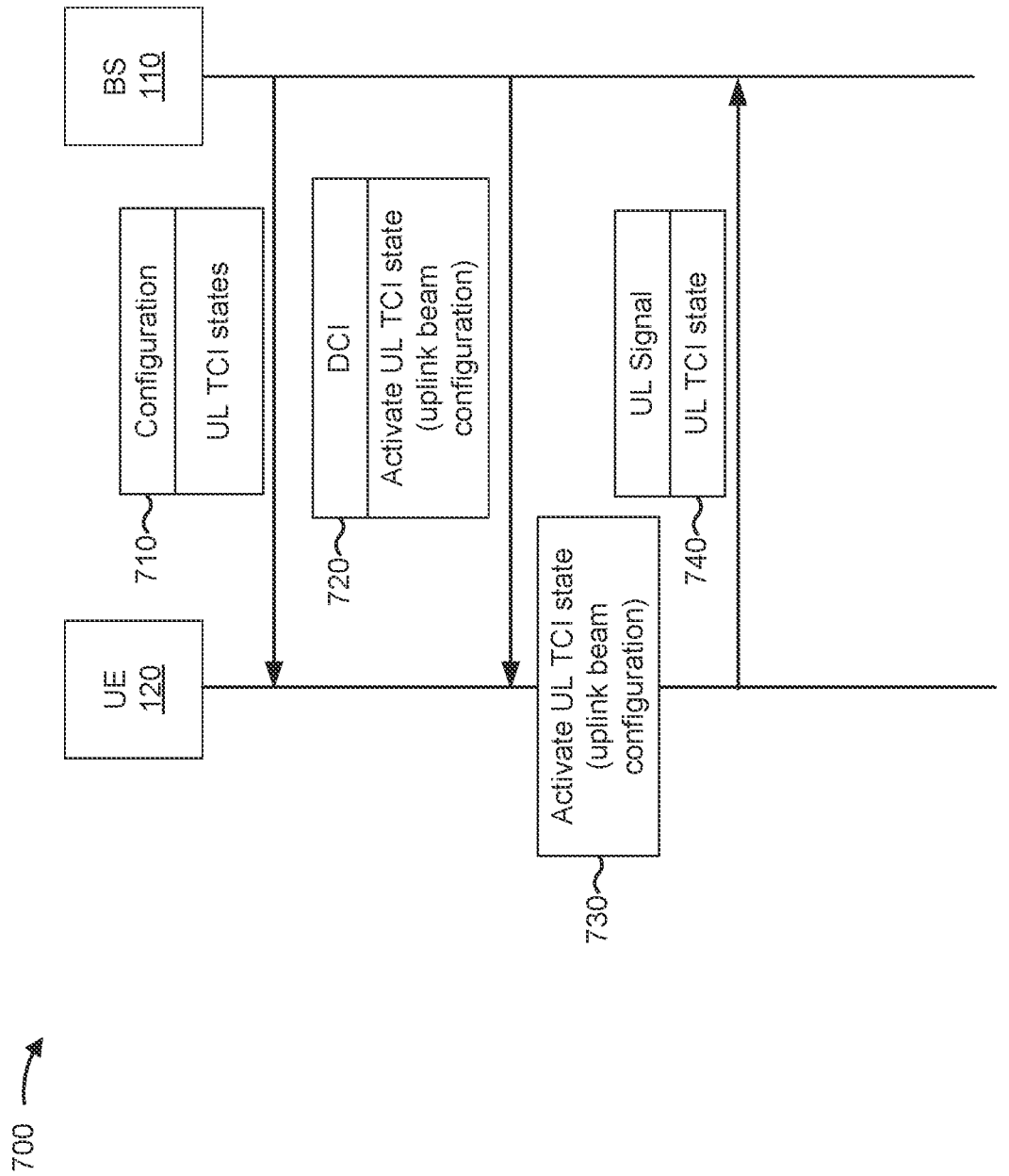

Example 700, shown in FIG. 7, is an example of DCI based activation of an uplink TCI state for a PUCCH, a PUSCH, a physical random access channel (PRACH), an SRS, or another type of channel.

As shown in FIG. 7, and by reference number 710, the BS 110 may provide configuration information to the UE 120. As further shown, the configuration information may include configuration information for a plurality of uplink TCI states. In some aspects, an uplink TCI state may be referred to as an uplink beam configuration. An uplink TCI state may include a TCI state to be used to generate a transmit beam in order to transmit an uplink signal, such as a PUCCH, a PUSCH, a PRACH, an SRS, and/or the like.

As shown by reference number 720, the BS 110 may transmit DCI to the UE 120. As further shown, the DCI may indicate that an uplink TCI state is to be activated. For example, the DCI may indicate that the uplink TCI state is available for use to perform a transmission. In other words, the DCI may indicate that an uplink beam configuration is to be activated. In some aspects, the DCI may include one or more parameters relating to the uplink beam configuration, may identify the uplink beam configuration, and/or the like.

In some aspects, the DCI may schedule an uplink or downlink signal, which may conserve computing resources that would otherwise be used to provide scheduling information separately from the DCI used to activate the uplink beam configuration. In some aspects, the DCI may not schedule an uplink or downlink communication, which may increase flexibility of timing of the DCI and reduce overhead associated with the DCI.

In some aspects, the DCI may include one or more parameters associated with the uplink beam configuration, such as a PUCCH/SRS/PUSCH/PRACH serving cell identifier and/or resource identifier, an SRS resource set identifier, and/or the like. In some aspects, the DCI may indicate an uplink TCI source reference signal identifier for a PUCCH/SRS/PUSCH/PRACH resource identifier. For example, the uplink TCI source reference signal may be an SSB, a CSI-RS, an SRS, and/or the like. In some aspects, the DCI may indicate a serving cell identifier and/or a bandwidth part identifier per uplink TCI source reference signal identifier.

In some aspects, a DCI format of the DCI may be based at least in part on an existing DCI format, such as DCI format 0_1 or 0_2 for PUSCH scheduling. In this case, the DCI may indicate that a spatial reference signal in a spatial relation with a selected SRS resource identifier in the DCI is applied or used as the uplink TCI source reference signal for one or more PUCCH/PUSCH/PRACH/SRS resource identifiers (e.g., using one or more reserved bits, a configurable field of the DCI, and/or the like). In some aspects, the DCI format may not be based at least in part on an existing format. For example, the DCI format may be a DCI format specific to TCI state activation (e.g., not based on DCI Format 0_0, 0_1, 1_0, 1_1, 1_1, 2_0, 2_1, 2_2, or 2_3).

As shown by reference number 730, the UE 120 may activate the uplink TCI state (e.g., the uplink beam configuration). For example, the UE 120 may determine that the uplink TCI state is available to transmit a communication. In some aspects, the UE 120 may use the activated uplink TCI state to transmit a communication. For example, the UE 120 may apply a particular spatial filter to a transmit antenna or antenna port group, may determine a spatial parameter of a beam used to transmit the PUCCH, SRS, PUSCH, or PRACH, and/or the like. By activating the uplink beam configuration using the DCI, the UE 120 and the BS 110 may reduce latency and overhead, thereby conserving computing resources.

As shown by reference number 740, the UE 120 may transmit, and the BS 110 may receive, the uplink communication in accordance with the activated uplink TCI state. For example, as described above, the UE 120 may use the TCI state that is activated for the uplink communication to determine QCL properties of a transmit beam and to generate the transmit beam to transmit the uplink communication. In some aspects, the UE 120 may perform a mobility operation, such as an intra-cell mobility operation or an inter-cell mobility operation, using one or more TCI states activated as described in connection with example 700.

Figure 8:
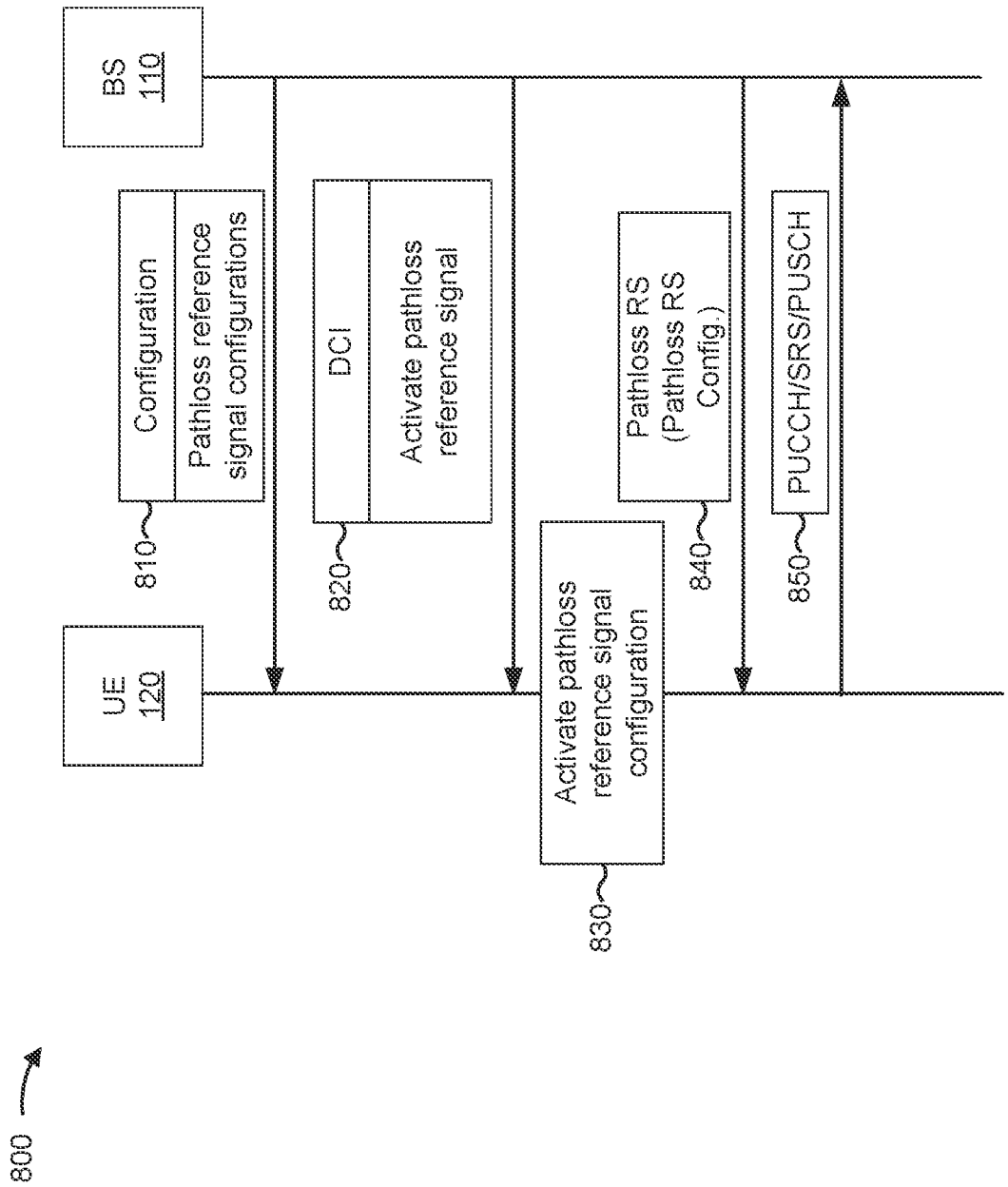

Example 800, shown in FIG. 8, is an example of DCI based activation of a pathloss reference signal configuration for a PUCCH, an SRS, a PUSCH, or another type of channel.

As shown in FIG. 8, and by reference number 810, the BS 110 may provide configuration information to the UE 120. As further shown, the configuration information may include configuration information for a pathloss reference signal configuration.

As shown in FIG. 8, and by reference number 810, the BS 110 may provide configuration information to the UE 120. As further shown, the configuration information may include configuration information for a plurality of pathloss reference signal configurations. A pathloss reference signal configuration may identify a resource allocation and/or another parameter for receiving a pathloss reference signal for a PUCCH, an SRS, a PUSCH, and/or the like.

As shown by reference number 820, the BS 110 may transmit DCI to the UE 120. As further shown, the DCI may indicate that a pathloss reference signal configuration is to be activated. For example, the DCI may indicate that the pathloss reference signal configuration is available for use to perform a transmission or reception of a pathloss reference signal. In some aspects, the DCI may include one or more parameters relating to the pathloss reference signal configuration, may identify the pathloss reference signal configuration, and/or the like.

In some aspects, the DCI may schedule an uplink or downlink signal, which may conserve computing resources that would otherwise be used to provide scheduling information separately from the DCI used to activate the pathloss reference signal configuration. In some aspects, the DCI may not schedule an uplink or downlink communication, which may increase flexibility of timing of the DCI and reduce overhead associated with the DCI.

In some aspects, the DCI may include one or more parameters associated with the pathloss reference signal configuration, such as a PUCCH/SRS/PUSCH serving cell identifier, a PUCCH resource identifier, an SRS resource set identifier, an SRS resource identifier for a PUSCH (e.g., sri-PUSCH-PowerControlId), an SRS resource identifier, a pathloss reference signal identifier, a pathloss reference signal serving cell identifier, a pathloss reference signal bandwidth part identifier, and/or the like.

In some aspects, a DCI format of the DCI may be based at least in part on an existing DCI format, such as DCI format 0_1 or 0_2 for PUSCH scheduling. In this case, the DCI may indicate that a spatial reference signal in a spatial relation with a selected SRS resource identifier in the DCI is applied or used as a pathloss reference signal for one or more PUCCH/SRS/PUSCH resource identifiers (e.g., using one or more reserved bits, a configurable field of the DCI, and/or the like). In some aspects, the DCI format may not be based at least in part on an existing format. For example, the DCI format may be a DCI format specific to TCI state activation (e.g., not based on DCI Format 0_0, 0_1, 1_0, 1_1, 1_1, 2_0, 2_1, 2_2, or 2_3).

As shown by reference number 830, the UE 120 may activate the pathloss reference signal configuration (e.g., the uplink beam configuration). For example, the UE 120 may determine that the pathloss reference signal is available for transmission of a pathloss reference signal. In some aspects, the UE 120 may perform a communication in accordance with the activated pathloss reference signal configuration. For example, the UE 120 may generate a receive beam in accordance with the pathloss reference signal configuration, may monitor a reference signal identified by the pathloss reference signal configuration, and/or the like. By activating the pathloss reference signal configuration using the DCI, the UE 120 and the BS 110 may reduce latency and overhead, thereby conserving computing resources.

As shown by reference number 840, the BS 110 may transmit, and the UE 120 may receive, a pathloss reference signal in accordance with the activated pathloss reference signal configuration. For example, as described above, the UE 120 may detect the pathloss reference signal in accordance with the pathloss reference signal configuration. In some aspects, the UE 120 may determine a spatial parameter or a power control parameter for a PUCCH, SRS, or PUSCH associated with the pathloss reference signal. The UE 120 may transmit the PUCCH, SRS, or PUSCH using the spatial parameter or the power control parameter, as shown by reference number 850. In some aspects, the UE 120 may perform a mobility operation, such as an intra-cell mobility operation or an inter-cell mobility operation, using one or more TCI states activated as described in connection with example 800.

As indicated above, FIGS. 3-8 are provided as one or more examples. Other examples may differ from what is described with respect to FIGS. 3-8.

FIG. 9 is a diagram illustrating an example process 900 performed, for example, by a UE, in accordance with various aspects of the present disclosure. Example process 900 is an example where the UE (e.g., UE 120 and/or the like) performs operations associated with DCI based beam and pathloss reference signal configuration activation. Dashed blocks in FIG. 9 indicate optional steps.

As shown in FIG. 9, in some aspects, process 900 may include receiving DCI that includes one or more parameters relating to activating at least one of an uplink beam configuration, a downlink beam configuration, or a pathloss reference signal configuration (block 910). For example, the UE (e.g., using antenna 252, DEMOD 254, MIMO detector 256, receive processor 258, controller/processor 280, and/or the like) may receive DCI, as shown by reference numbers 310, 410, 510, 610, 710, and 810. The DCI may include one or more parameters relating to activating at least one of an uplink beam configuration (for example, the PUCCH/SRS spatial relation of FIG. 6 or the uplink TCI state of FIG. 7), a downlink beam configuration (for example, the PDCCH TCI state of FIG. 3, the PDSCH TCI state of FIG. 4, or the CSI-RS TCI state of FIG. 5), or a pathloss reference signal configuration (as shown in FIG. 8), as described above.

As further shown in FIG. 9, in some aspects, process 900 may include activating the uplink beam configuration, the downlink beam configuration, or the pathloss reference signal configuration in accordance with the DCI (block 920). For example, the UE (e.g., using antenna 252, DEMOD 254, MIMO detector 256, receive processor 258, controller/processor 280, transmit processor 264, TX MIMO processor 266, MOD 254, and/or the like) may activate the uplink beam configuration (as shown by reference numbers 630 and 730), the downlink beam configuration (as shown by reference numbers 330, 430, and 530), or the pathloss reference signal configuration (as shown by reference number 830) in accordance with the DCI, as described above.

As further shown in FIG. 9, in some aspects, process 900 may include receiving or transmitting a communication on a beam in accordance with the uplink beam configuration, the downlink beam configuration, or the pathloss reference signal configuration (block 930). For example, the UE (e.g., using antenna 252, DEMOD 254, MIMO detector 256, receive processor 258, controller/processor 280, transmit processor 264, TX MIMO processor 266, MOD 254, and/or the like) may receive or transmit a communication on a beam in accordance with the uplink beam configuration, the downlink beam configuration, or the pathloss reference signal configuration, as described above. Transmitting a communication in accordance with the uplink beam configuration is shown by reference numbers 640 and 740. Receiving a communication in accordance with the downlink beam configuration is shown by reference numbers 340, 440, and 540. Receiving a communication (e.g., a pathloss reference signal) in accordance with the pathloss reference signal configuration is shown by reference number 840, and transmitting a communication (e.g., a PUSCH, PUCCH, or SRS) based at least in part on the pathloss reference signal is shown by reference number 850.

Process 900 may include additional aspects, such as any single aspect or any combination of aspects described below and/or in connection with one or more other processes described elsewhere herein.

In a first aspect, the downlink beam configuration comprises at least one of a PDCCH TCI state, a PDSCH TCI state, a semi-persistent (SP) CSI-RS TCI state, or an aperiodic (AP) CSI-RS TCI state. In a second aspect, alone or in combination with the first aspect, when the downlink beam configuration comprises the PDCCH TCI state, the DCI indicates at least one of a serving cell identifier, a control resource set identifier, or a TCI state identifier. In a third aspect, alone or in combination with one or more of the first and second aspects, when the downlink beam configuration comprises the PDSCH TCI state, the DCI indicates at least one of a serving cell identifier, a bandwidth part identifier, or a TCI state identifier. In a fourth aspect, alone or in combination with one or more of the first through third aspects, when the downlink beam configuration comprises the SP CSI-RS TCI state or the AP CSI-RS TCI state, the DCI indicates at least one of a CSI-RS resource set identifier, a serving cell identifier corresponding to the CSI-RS resource set identifier, or a bandwidth part identifier corresponding to the CSI-RS resource set identifier. In a fifth aspect, alone or in combination with one or more of the first through fourth aspects, the DCI indicates one or more active TCI state identifiers corresponding to the CSI-RS resource set identifier.

In a sixth aspect, alone or in combination with one or more of the first through fifth aspects, the uplink beam configuration comprises at least one of a spatial relation for a PUCCH, a spatial relation for an SRS, a PUCCH TCI state, a PUSCH TCI state, a PRACH TCI state, or an SRS TCI state. In a seventh aspect, alone or in combination with one or more of the first through sixth aspects, the DCI indicates at least one of a serving cell identifier, a resource identifier, or an SRS resource set identifier.

In an eighth aspect, alone or in combination with one or more of the first through seventh aspects, the pathloss reference signal configuration is for at least one of: a PUCCH, a PUSCH, or an SRS. In a ninth aspect, alone or in combination with one or more of the first through eighth aspects, the DCI indicates at least one of a serving cell identifier for the PUCCH, a serving cell identifier for the PUSCH, or a serving cell identifier for the SRS. In a tenth aspect, alone or in combination with one or more of the first through ninth aspects, the DCI indicates at least one of a PUCCH resource identifier, an SRS resource set identifier, an SRS resource indicator power control parameter, or an SRS resource indicator. In an eleventh aspect, alone or in combination with one or more of the first through tenth aspects, the DCI indicates at least one of a pathloss reference signal configuration identifier, a pathloss reference signal configuration serving cell identifier, or a pathloss reference signal configuration bandwidth part identifier.

In a twelfth aspect, alone or in combination with one or more of the first through eleventh aspects, the DCI is associated with a DCI format that includes scheduling information for an uplink or downlink signal. In a thirteenth aspect, alone or in combination with one or more of the first through twelfth aspects, the DCI is associated with a DCI format that does not include scheduling information for an uplink or downlink signal. In a fourteenth aspect, alone or in combination with one or more of the first through thirteenth aspects, the DCI indicates one or more quasi-co-location source reference signals corresponding to one or more quasi-co-location types for the uplink beam configuration, the downlink beam configuration, or the pathloss reference signal configuration.

In a fifteenth aspect, alone or in combination with one or more of the first through fourteenth aspects, the one or more uplink TCI source reference signals correspond to one or more physical uplink control channel resource identifiers, one or more sounding reference signal resource identifiers, one or more physical uplink shared channel resource identifiers, or one or more physical random access channel resource identifiers. In a sixteenth aspect, alone or in combination with one or more of the first through fifteenth aspects, the DCI indicates one or more serving cell identifiers or one or more bandwidth part identifiers corresponding to the one or more uplink TCI source reference signals. In a seventeenth aspect, alone or in combination with one or more of the first through sixteenth aspects, the DCI indicates one or more spatial relation reference signal identifiers corresponding to one or more physical uplink control channels, or one or more sounding reference signal resource identifiers.

In an eighteenth aspect, alone or in combination with one or more of the first through seventeenth aspects, the DCI indicates one or more serving cell identifiers or one or more bandwidth part identifiers corresponding to the one or more spatial relation reference signal identifiers. In a nineteenth aspect, alone or in combination with one or more of the first through eighteenth aspects, the DCI is associated with a DCI format for scheduling a physical downlink shared channel or a physical uplink shared channel. In a twentieth aspect, alone or in combination with one or more of the first through nineteenth aspects, a reserved bit or a field of the DCI indicates that the uplink beam configuration, the downlink beam configuration, or the pathloss reference signal configuration is to be activated. In a twenty-first aspect, alone or in combination with one or more of the first through twentieth aspects, the DCI indicates that the uplink beam configuration, the downlink beam configuration, or the pathloss reference signal configuration is to be activated based at least in part on the uplink beam configuration, the downlink beam configuration, or the pathloss reference signal configuration being inactive prior to receiving the DCI.

In a twenty-second aspect, alone or in combination with one or more of the first through twenty-first aspects, the DCI indicates a mapping between a TCI state of the downlink beam configuration and a control resource set identifier. In a twenty-third aspect, alone or in combination with one or more of the first through twenty-second aspects, the DCI indicates a TCI state of the downlink beam configuration that is activated for a physical downlink shared channel.

In a twenty-fourth aspect, alone or in combination with one or more of the first through twenty-third aspects, the DCI indicates a mapping between an activated TCI state of the downlink beam configuration and a channel state information reference signal identifier. In a twenty-fifth aspect, alone or in combination with one or more of the first through twenty-fourth aspects, the DCI indicates a mapping between a spatial relation of a selected SRS resource indicator of the DCI and a physical uplink control channel resource identifier or a sounding reference signal resource identifier.

In a twenty-sixth aspect, alone or in combination with one or more of the first through twenty-fifth aspects, the DCI indicates that a spatial reference signal for a spatial relation of a selected SRS resource indicator of the DCI is to be used as a source reference signal for a physical uplink control channel resource identifier, a physical uplink shared channel resource identifier, a physical random access channel resource identifier, or a sounding reference signal resource identifier. In a twenty-seventh aspect, alone or in combination with one or more of the first through twenty-sixth aspects, the DCI indicates that a spatial reference signal for a spatial relation of a selected SRS resource indicator of the DCI is to be used as a pathloss reference signal for a physical uplink control channel resource identifier, a physical uplink shared channel resource identifier, a physical random access channel resource identifier, or a sounding reference signal resource identifier.

In a twenty-eighth aspect, alone or in combination with one or more of the first through twenty-seventh aspects, the DCI is first DCI, and the process 900 includes receiving second DCI, prior to receiving or transmitting the communication, indicating that the uplink beam configuration, the downlink beam configuration, or the pathloss reference signal configuration is to be used for the communication, wherein receiving or transmitting the communication on the beam is based at least in part on the second DCI. In a twenty-ninth aspect, alone or in combination with one or more of the first through twenty-eighth aspects, the communication is performed in association with an inter-cell mobility operation or an intra-cell mobility operation.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with DCI based beam and pathloss reference signal configuration activation.

As shown in FIG. 10, in some aspects, process 1000 may include transmitting, to a UE, DCI that includes one or more parameters relating to activating at least one of an uplink beam configuration, a downlink beam configuration, or a pathloss reference signal configuration (block 1010). For example, the base station (e.g., using controller/processor 240, transmit processor 220, TX MIMO processor 230, MOD 232, antenna 234, and/or the like) may transmit, to a UE, DCI that includes one or more parameters relating to activating at least one of an uplink beam configuration, a downlink beam configuration, or a pathloss reference signal configuration, as described above. The transmission of the DCI is shown, for example, by reference numbers 310, 410, 510, 610, 710, and 810. The one or more parameters may relate to activating an uplink beam configuration (for example, the PUCCH/SRS spatial relation of FIG. 6 or the uplink TCI state of FIG. 7), a downlink beam configuration (for example, the PDCCH TCI state of FIG. 3, the PDSCH TCI state of FIG. 4, or the CSI-RS TCI state of FIG. 5), or a pathloss reference signal configuration (as shown in FIG. 8), as described above.

As further shown in FIG. 10, in some aspects, process 1000 may include communicating with the UE in accordance with one or more of the uplink beam configuration, the downlink beam configuration, or the pathloss reference signal configuration (block 1020). For example, the base station (e.g., using controller/processor 240, transmit processor 220, TX MIMO processor 230, MOD 232, DEMOD 232, MIMO detector 236, receive processor 238, and/or the like) may communicate with the UE in accordance with one or more of the uplink beam configuration, the downlink beam configuration, or the pathloss reference signal configuration, as described above. Receiving a communication from the UE in accordance with the uplink beam configuration is shown by reference numbers 640 and 740. Transmitting a communication in accordance with the downlink beam configuration is shown by reference numbers 340, 440, and 540. Transmitting a communication (e.g., a pathloss reference signal) in accordance with the pathloss reference signal configuration is shown by reference number 840, and receiving a communication (e.g., a PUSCH, PUCCH, or SRS) based at least in part on the pathloss reference signal is shown by reference number 850.

Process 1000 may include additional aspects, such as any single aspect or any combination of aspects described below and/or in connection with one or more other processes described elsewhere herein.

In a first aspect, the downlink beam configuration comprises at least one of a PDCCH TCI state, a PDSCH TCI state, an SP-CSI-RS TCI state, or an AP-CSI-RS TCI state. In a second aspect, alone or in combination with the first aspect, when the downlink beam configuration comprises the PDCCH TCI state, the DCI indicates at least one of a serving cell identifier, a control resource set identifier, or a TCI state identifier. In a third aspect, alone or in combination with one or more of the first and second aspects, when the downlink beam configuration comprises the PDSCH TCI state, the DCI indicates at least one of a serving cell identifier, a bandwidth part identifier, or a TCI state identifier. In a fourth aspect, alone or in combination with one or more of the first through third aspects, when the downlink beam configuration comprises the SP CSI-RS TCI state or the AP CSI-RS TCI state, the DCI indicates at least one of a CSI-RS resource set identifier, a serving cell identifier corresponding to the CSI-RS resource set identifier, or a bandwidth part identifier corresponding to the CSI-RS resource set identifier. In a fifth aspect, alone or in combination with one or more of the first through fourth aspects, the DCI indicates one or more active TCI state identifiers corresponding to the CSI-RS resource set identifier.

In a sixth aspect, alone or in combination with one or more of the first through fifth aspects, the uplink beam configuration comprises at least one of a spatial relation for a PUCCH, a spatial relation for an SRS, a PUCCH TCI state, a PUSCH TCI state, a PRACH TCI state, or an SRS TCI state. In a seventh aspect, alone or in combination with one or more of the first through sixth aspects, the DCI indicates at least one of a serving cell identifier, a resource identifier, or an SRS resource set identifier.

In an eighth aspect, alone or in combination with one or more of the first through seventh aspects, the pathloss reference signal configuration is for at least one of: a PUCCH, a PUSCH, or an SRS. In a ninth aspect, alone or in combination with one or more of the first through eighth aspects, the DCI indicates at least one of a serving cell identifier for the PUCCH, a serving cell identifier for the PUSCH, or a serving cell identifier for the SRS. In a tenth aspect, alone or in combination with one or more of the first through ninth aspects, the DCI indicates at least one of a PUCCH resource identifier, an SRS resource set identifier, an SRS resource indicator power control parameter, or an SRS resource indicator.

In an eleventh aspect, alone or in combination with one or more of the first through tenth aspects, the DCI indicates at least one of a pathloss reference signal configuration identifier, a pathloss reference signal configuration serving cell identifier, or a pathloss reference signal configuration bandwidth part identifier. In a twelfth aspect, alone or in combination with one or more of the first through eleventh aspects, the DCI is associated with a DCI format that includes scheduling information for an uplink or downlink signal. In a thirteenth aspect, alone or in combination with one or more of the first through twelfth aspects, the DCI is associated with a DCI format that does not include scheduling information for an uplink or downlink signal.

In a fourteenth aspect, alone or in combination with one or more of the first through thirteenth aspects, the DCI indicates one or more quasi-colocation source reference signals corresponding to one or more quasi-colocation types for the uplink beam configuration, the downlink beam configuration, or the pathloss reference signal configuration. In a fifteenth aspect, alone or in combination with one or more of the first through fourteenth aspects, the one or more uplink TCI source reference signals correspond to one or more physical uplink control channel resource identifiers, one or more sounding reference signal resource identifiers, one or more physical uplink shared channel resource identifiers, or one or more physical random access channel resource identifiers. In a sixteenth aspect, alone or in combination with one or more of the first through fifteenth aspects, the DCI indicates one or more serving cell identifiers or one or more bandwidth part identifiers corresponding to the one or more uplink TCI source reference signals.

In a seventeenth aspect, alone or in combination with one or more of the first through sixteenth aspects, the DCI indicates one or more spatial relation reference signal identifiers corresponding to one or more physical uplink control channels, or one or more sounding reference signal resource identifiers. In an eighteenth aspect, alone or in combination with one or more of the first through seventeenth aspects, the DCI indicates one or more serving cell identifiers or one or more bandwidth part identifiers corresponding to the one or more spatial relation reference signal identifiers. In a nineteenth aspect, alone or in combination with one or more of the first through eighteenth aspects, the DCI is associated with a DCI format for scheduling a physical downlink shared channel or a physical uplink shared channel.

In a twentieth aspect, alone or in combination with one or more of the first through nineteenth aspects, a reserved bit or a field of the DCI indicates that the uplink beam configuration, the downlink beam configuration, or the pathloss reference signal configuration is to be activated. In a twenty-first aspect, alone or in combination with one or more of the first through twentieth aspects, the DCI indicates that the uplink beam configuration, the downlink beam configuration, or the pathloss reference signal configuration is to be activated based at least in part on the uplink beam configuration, the downlink beam configuration, or the pathloss reference signal configuration being inactive prior to receiving the DCI.

In a twenty-second aspect, alone or in combination with one or more of the first through twenty-first aspects, the DCI indicates a mapping between a TCI state of the downlink beam configuration and a control resource set identifier. In a twenty-third aspect, alone or in combination with one or more of the first through twenty-second aspects, the DCI indicates a TCI state of the downlink beam configuration that is activated for a physical downlink shared channel. In a twenty-fourth aspect, alone or in combination with one or more of the first through twenty-third aspects, the DCI indicates a mapping between an activated TCI state of the downlink beam configuration and a channel state information reference signal identifier. In a twenty-fifth aspect, alone or in combination with one or more of the first through twenty-fourth aspects, the DCI indicates a mapping between a spatial relation of a selected SRS resource indicator of the DCI and a physical uplink control channel resource identifier or a sounding reference signal resource identifier. In a twenty-sixth aspect, alone or in combination with one or more of the first through twenty-fifth aspects, the DCI indicates that a spatial reference signal for a spatial relation of a selected SRS resource indicator of the DCI is to be used as a source reference signal for a physical uplink control channel resource identifier, a physical uplink shared channel resource identifier, a physical random access channel resource identifier, or a sounding reference signal resource identifier. In a twenty-seventh aspect, alone or in combination with one or more of the first through twenty-sixth aspects, the DCI indicates that a spatial reference signal for a spatial relation of a selected SRS resource indicator of the DCI is to be used as a pathloss reference signal for a physical uplink control channel resource identifier, a physical uplink shared channel resource identifier, a physical random access channel resource identifier, or a sounding reference signal resource identifier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
one or more memories; and
one or more processors coupled to the one or more memories, the one or more processors configured to:
receive downlink control information (DCI) that includes one or more parameters relating to indicating an uplink beam configuration and a downlink beam configuration,
the uplink beam configuration comprising at least one of an uplink transmission configuration indicator (TCI) state for a physical uplink control channel (PUCCH), a PUCCH spatial relation, or a sounding reference signal (SRS) spatial relation,
the downlink beam configuration comprising at least one of a physical downlink control channel (PDCCH) TCI state, a physical downlink shared channel (PDSCH) TCI state, or a channel state information reference signal (CSI-RS) TCI state, and
the DCI indicating one or more uplink TCI source reference signals corresponding to one or more quasi-colocation types for the uplink beam configuration and a mapping between a TCI state of the downlink beam configuration and a control resource set identifier;
update the uplink beam configuration and the downlink beam configuration in accordance with the DCI; and
communicate in accordance with the updated uplink beam configuration and the updated downlink beam configuration.

2. The UE of claim 1, wherein the DCI includes a serving cell identifier for the downlink beam configuration.

3. The UE of claim 1, wherein the DCI identifies a quasi co-location reference signal for the downlink beam configuration.

4. The UE of claim 1, wherein the DCI is associated with a DCI format that includes scheduling information for an uplink or downlink signal.

5. The UE of claim 1, wherein the DCI is associated with a DCI format that does not include scheduling information for an uplink or downlink signal.

6. The UE of claim 1, wherein the DCI indicates one or more SRS resource identifiers.

7. The UE of claim 1, wherein a reserved bit or a field of the DCI indicates that the uplink beam configuration or the downlink beam configuration is to be updated.

8. The UE of claim 1, wherein the DCI indicates that the uplink beam configuration or the downlink beam configuration is to be updated based at least in part on the uplink beam configuration or the downlink beam configuration being inactive prior to receiving the DCI.

9. The UE of claim 1, wherein the DCI indicates a TCI state of the downlink beam configuration that is activated for a PDSCH.

10. The UE of claim 1, wherein the DCI indicates a mapping between an activated TCI state of the downlink beam configuration and a CSI-RS identifier.

11. The UE of claim 1, wherein the DCI indicates a mapping between an SRS resource indicator of the DCI and a PUCCH resource identifier or an SRS resource identifier.

12. The UE of claim 1, wherein the one or more processors, to communicate in accordance with the updated uplink beam configuration and the updated downlink beam configuration, are configured to:
receive or transmit a communication on a beam in accordance with the updated uplink beam configuration or the updated downlink beam configuration,
the beam corresponding to a beam via which the DCI is received.

13. The UE of claim 12, wherein the DCI is first DCI, and wherein the one or more processors are configured to:
receive second DCI, prior to receiving or transmitting the communication, indicating that the uplink beam configuration or the downlink beam configuration, wherein receiving or transmitting the communication on the beam is based at least in part on the second DCI.

14. The UE of claim 1, wherein the UE communicates in accordance with the updated uplink beam configuration during a mobility operation, wherein the mobility operation comprises a Layer 1/Layer 2 centric inter-cell mobility operation or an intra-cell mobility operation.

15. The UE of claim 1, wherein the DCI is received via a single DCI message.

16. The UE of claim 15, wherein the DCI includes a single TCI state.

17. The UE of claim 15, wherein the DCI includes a plurality of TCI states.

18. The UE of claim 17, wherein the plurality of TCI states includes the uplink TCI state and one or more of the PDCCH TCI state or the PDSCH TCI state.

19. A base station for wireless communication, comprising:
one or more memories; and
one or more processors coupled to the one or more memories, the one or more processors configured to:
transmit, to a user equipment (UE), downlink control information (DCI) that includes one or more parameters relating to indicating an uplink beam configuration and a downlink beam configuration,
the uplink beam configuration comprising at least one of an uplink transmission configuration indicator (TCI) state for a physical uplink control channel (PUCCH), a PUCCH spatial relation, or a sounding reference signal (SRS) spatial relation,
the downlink beam configuration comprising at least one of a physical downlink control channel (PDCCH) TCI state, a physical downlink shared channel (PDSCH) TCI state, or a channel state information reference signal (CSI-RS) TCI state, and
the DCI indicating one or more uplink TCI source reference signals corresponding to one or more quasi-colocation types for the uplink beam configuration and a mapping between a TCI state of the downlink beam configuration and a control resource set identifier; and
communicate with the UE in accordance with the uplink beam configuration and the downlink beam configuration.

20. The base station of claim 19, wherein the DCI is associated with a DCI format that includes scheduling information for an uplink or downlink signal.

21. The base station of claim 19, wherein the DCI is associated with a DCI format for scheduling a physical downlink shared channel or a physical uplink shared channel.

22. The base station of claim 19, wherein the DCI is received via a single DCI message.

23. The base station of claim 22, wherein the DCI includes a plurality of TCI states.

24. A method of wireless communication performed by a user equipment (UE), comprising:
receiving downlink control information (DCI) that includes one or more parameters relating to indicating an uplink beam configuration and a downlink beam configuration,
the uplink beam configuration comprising at least one of an uplink transmission configuration indicator (TCI) state for a physical uplink control channel (PUCCH), a PUCCH spatial relation, or a sounding reference signal (SRS) spatial relation,
the downlink beam configuration comprising at least one of a physical downlink control channel (PDCCH) TCI state, a physical downlink shared channel (PDSCH) TCI state, or a channel state information reference signal (CSI-RS) TCI state, and
the DCI indicating one or more uplink TCI source reference signals corresponding to one or more quasi-colocation types for the uplink beam configuration and a mapping between a TCI state of the downlink beam configuration and a control resource set identifier;
updating the uplink beam configuration and the downlink beam configuration in accordance with the DCI; and
communicating in accordance with the updated uplink beam configuration and the updated downlink beam configuration.

25. The method of claim 24, wherein the DCI is associated with a DCI format that includes scheduling information for an uplink or downlink signal.

26. The method of claim 24, wherein the DCI is received via a single DCI message.

27. The method of claim 26, wherein the DCI includes a plurality of TCI states.

28. A method of wireless communication performed by a base station, comprising:
transmitting, to a user equipment (UE), downlink control information (DCI) that includes one or more parameters relating to indicating an uplink beam configuration and a downlink beam configuration,
the uplink beam configuration comprising at least one of an uplink transmission configuration indicator (TCI) state for a physical uplink control channel (PUCCH), a PUCCH spatial relation, or a sounding reference signal (SRS) spatial relation, the downlink beam configuration comprising at least one of a physical downlink control channel (PDCCH) TCI state, a physical downlink shared channel (PDSCH) TCI state, or a channel state information reference signal (CSI-RS) TCI state, and the DCI indicating one or more uplink TCI source reference signals corresponding to one or more quasi-colocation types for the uplink beam configuration and a mapping between a TCI state of the downlink beam configuration and a control resource set identifier; and communicating with the UE in accordance with one or more of the uplink beam configuration or the downlink beam configuration.

29. The method of claim 28, wherein the DCI is received via a single DCI message.

30. The method of claim 29, wherein the DCI includes a plurality of TCI states.

* * * * *